US011886546B2

United States Patent
Burriesci et al.

(10) Patent No.: US 11,886,546 B2
(45) Date of Patent: *Jan. 30, 2024

(54) SYSTEMS AND METHODS FOR DYNAMICALLY RESTRICTING THE RENDERING OF UNAUTHORIZED CONTENT INCLUDED IN INFORMATION RESOURCES

(71) Applicant: Google LLC, Mountain View, CA (US)

(72) Inventors: Matthew Burriesci, Mountain View, CA (US); Rebecca Illowsky, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/202,082

(22) Filed: Mar. 15, 2021

(65) Prior Publication Data
US 2021/0203679 A1 Jul. 1, 2021

Related U.S. Application Data

(63) Continuation of application No. 16/062,015, filed as application No. PCT/US2016/034605 on May 27, 2016, now Pat. No. 10,951,634.
(Continued)

(51) Int. Cl.
*G06F 21/00* (2013.01)
*G06F 21/10* (2013.01)
(Continued)

(52) U.S. Cl.
CPC ............ *G06F 21/10* (2013.01); *G06F 16/986* (2019.01); *G06F 21/125* (2013.01);
(Continued)

(58) Field of Classification Search
CPC ............ H04L 63/1416; H04L 63/1408; G06F 16/986; G06F 21/10; G06F 21/125; G06F 21/128; G06F 21/6209; G06V 10/56
See application file for complete search history.

(56) References Cited

U.S. PATENT DOCUMENTS 6,271,840 B1 * 8/2001 Finseth ................. G06F 16/951
715/236
7,788,577 B2 8/2010 Lueck
(Continued)

FOREIGN PATENT DOCUMENTS

EP 2 642 715 9/2013

OTHER PUBLICATIONS

"Writing AdBlock Plus Filters", Nov. 12, 2010, retrieved Aug. 10, 2019 from URL: https://www.cnblogs.com/xfixer/archive/2010/11/12/1875492.html (2 pages).
(Continued)

*Primary Examiner* — Ghazal B Shehni
(74) *Attorney, Agent, or Firm* — MARSHALL, GERSTEIN & BORUN LLP

(57) ABSTRACT

Systems and methods for dynamically restricting rendering of unauthorized content included in information resources are provided herein. A computing device can identify an information resource including a content object specifying one or more graphical characteristics. The computing device can determine that the content object corresponds to a restricted content object by applying at least one of an action-based detection policy to detect actions performed on the information resource or a visual-based detection policy to detect the graphical characteristics of the content object. The computing device can modify by applying a content rendering restriction policy the information resource to alter
(Continued)

rendering of the content element on the information resource responsive to the determination.

22 Claims, 9 Drawing Sheets

Related U.S. Application Data

(60) Provisional application No. 62/289,703, filed on Feb. 1, 2016.

(51) Int. Cl.
  *G06F 16/958* (2019.01)
  *H04L 9/40* (2022.01)
  *G06F 21/62* (2013.01)
  *G06F 21/12* (2013.01)

(52) U.S. Cl.
  CPC ........ *G06F 21/128* (2013.01); *G06F 21/6209* (2013.01); *H04L 63/1408* (2013.01); *H04L 63/1416* (2013.01)

(56) References Cited

U.S. PATENT DOCUMENTS

| | | | |
|---|---|---|---|
| 8,671,352 | B1 | 3/2014 | Hsu et al. |
| 8,677,481 | B1 | 3/2014 | Lee |
| 8,732,800 | B1* | 5/2014 | Askew ................ G06F 21/604 713/182 |
| 8,850,010 | B1 | 9/2014 | Qureshi |
| 9,231,975 | B2 | 1/2016 | Johns |
| 9,237,311 | B2 | 1/2016 | Raftelis et al. |
| 9,311,422 | B2 | 4/2016 | Rumsey et al. |
| 9,407,658 | B1 | 8/2016 | Kuskov et al. |
| 9,575,941 | B1 | 2/2017 | Westbrook et al. |
| 9,692,787 | B1 | 6/2017 | Warner et al. |
| 9,697,190 | B2 | 7/2017 | Baldwin et al. |
| 9,792,267 | B2 | 10/2017 | Tupil et al. |
| 9,811,509 | B2 | 11/2017 | Gnech et al. |
| 10,007,647 | B2 | 6/2018 | Falkenberg et al. |
| 10,078,626 | B1 | 9/2018 | Voskamp |
| 10,241,978 | B2 | 3/2019 | Levi et al. |
| 10,303,526 | B2 | 5/2019 | Urim et al. |
| 2003/0145197 | A1 | 7/2003 | Lee et al. |
| 2005/0114516 | A1 | 5/2005 | Smith et al. |
| 2007/0256010 | A1 | 11/2007 | Blackmon et al. |
| 2008/0027866 | A1 | 1/2008 | Halcrow et al. |
| 2008/0034404 | A1 | 2/2008 | Pereira et al. |
| 2008/0155392 | A1 | 6/2008 | Coutts |
| 2008/0256439 | A1 | 10/2008 | Boreham et al. |
| 2009/0216769 | A1* | 8/2009 | Bellwood ................ G06F 21/10 707/999.009 |
| 2010/0185953 | A1 | 7/2010 | Grandemenge |
| 2012/0166933 | A1 | 6/2012 | Cui et al. |
| 2013/0054371 | A1* | 2/2013 | Mason ................ G06Q 30/0256 705/14.64 |
| 2013/0061132 | A1 | 3/2013 | Zheng et al. |
| 2013/0254655 | A1 | 9/2013 | Nykyforov |
| 2013/0263280 | A1 | 10/2013 | Cote |
| 2014/0208197 | A1 | 7/2014 | Ellis et al. |
| 2014/0245115 | A1 | 8/2014 | Zhang et al. |
| 2015/0074516 | A1 | 3/2015 | Ben-Aharon et al. |
| 2015/0128064 | A1 | 5/2015 | Fleming |
| 2015/0278172 | A1 | 10/2015 | Tupil et al. |
| 2015/0339461 | A1* | 11/2015 | Min ................ H04L 51/222 726/28 |
| 2016/0028743 | A1 | 1/2016 | Johns et al. |
| 2016/0110082 | A1 | 4/2016 | Zhang et al. |
| 2016/0364369 | A1 | 12/2016 | Zhou |
| 2017/0017380 | A1 | 1/2017 | Mehrotra et al. |
| 2017/0111393 | A1* | 4/2017 | Omata ................ H04L 63/102 |

OTHER PUBLICATIONS

Corrected Notice of Allowance for U.S. Appl. No. 16/062,015 dated Dec. 4, 2020 (2 pages).
Decision of Rejection for CN Appln. Ser. No. 201680001924.0 dated Jul. 3, 2020 (6 pages).
European Search Report for EP Appln. Ser. No. 19181490.4 dated Aug. 13, 2019 (6 pages).
Examination Report for EP Appln. Ser. No. 16728803.04 dated Mar. 13, 2020 (4 pages).
Examination Report for EP Appln. Ser. No. 16728803.4 dated Apr. 26, 2019 (6 pages).
Examination Report for EP Appln. Ser. No. 16728803.4 dated Oct. 15, 2019 (8 pages).
Final Office Action for U.S. Appl. No. 16/062,022 dated Dec. 20, 2019 (10 pages).
Final Office Action for U.S. Appl. No. 16/062,022 dated Oct. 20, 2020 (15 pages).
First Office Action for CN Appln. Ser. No. 201680001924.0 dated Oct. 9, 2019 (16 pages).
First Office Action for CN Appln. Ser. No. 201680053721.6 dated Jul. 23, 2020 (13 pages).
German Office Action for Appln. Ser. No. 202016107277.8 dated Mar. 24, 2017 (1 page).
International Preliminary Report on Patentability, Ch. II, for PCT Appln. Ser. No. PCT/US2016/034600 dated Jan. 3, 2018 (18 pages).
International Preliminary Report on Patentability, Ch. II, for PCT Appln. Ser. No. PCT/US2016/034605 dated Apr. 25, 2018 (32 pages).
International Search Report and Written Opinion for PCT Appln. Ser. No. PCT/US2016/034600 dated Oct. 27, 2016 (13 pages).
International Search Report and Written Opinion for PCT Appln. Ser. No. PCT/US2016/034605 dated Oct. 7, 2016 (11 pages).
Johns et al., "Tamper-Resistant LikeJacking Protection", SAP Security Research, Oct. 23, 2013, pp. 265-285, Germany (21 pages).
Non-Final Office Action for U.S. Appl. No. 16/062,015 dated Apr. 24, 2020 (8 pages).
Non-Final Office Action for U.S. Appl. No. 16/062,022 dated Jul. 7, 2020 (14 pages).
Non-Final Office Action for U.S. Appl. No. 16/062,022 dated Sep. 17, 2019 (8 pages).
Notice of Allowance for U.S. Appl. No. 16/062,015 dated Oct. 27, 2020 (6 pages).
Notice of Allowance for U.S. Appl. No. 16/062,022 dated Mar. 16, 2021 (14 pages).
Post et al., "Comparative Study and Evaluation of Online Ad-Blockers", 2015 2nd International Conference on Information Science and Security, IEEE, Dec. 14, 2015 (4 pages).
Reis et al., "Detecting In-Flight Page Changes with Web Tripwires", NSDI '08: 5th USENIX Symposium on Networked Systems Design and Implementation, USENIX Association, Apr. 5, 2008, pp. 31-44 (14 pages).
Second Office Action for CN Appln. Ser. No. 201680001924.0 dated Mar. 31, 2020 (13 pages).
"AdBlock Plus filters explained", AdBlock Plus, Jan. 29, 2016, retrieved Mar. 19, 2021 from URL: https://web.archive.org/web/20160129174040/https://adblockplus.org/filter-cheatsheet (7 pages).
"CSS Layout—The position Property", W3Schools, Jan. 29, 2016, retrieved Mar. 19, 2021 from URL: https://web.archive.org/web/20160129003053/http://www.w3schools.com/css/css_positioning.asp (9 pages).
Examination Report for EP Appln. Ser. No. 21156963.7 dated Mar. 31, 2021 (9 pages).

* cited by examiner

SYSTEMS AND METHODS FOR DYNAMICALLY RESTRICTING THE RENDERING OF UNAUTHORIZED CONTENT INCLUDED IN INFORMATION RESOURCES

RELATED APPLICATIONS

The present application claims priority under 35 U.S.C. § 120 as a continuation application of U.S. patent application Ser. No. 16/062,015, titled "SYSTEMS AND METHODS FOR DYNAMICALLY RESTRICTING THE RENDERING OF UNAUTHORIZED CONTENT INCLUDED IN INFORMATION RESOURCES" and filed Jun. 13, 2018, which is a National Stage Application under 35 U.S.C. § 371 of International Patent Application No. PCT/US2016/034605, titled "SYSTEMS AND METHODS FOR DYNAMICALLY RESTRICTING THE RENDERING OF UNAUTHORIZED CONTENT INCLUDED IN INFORMATION RESOURCES" and filed May 27, 2016, which claims priority to U.S. Provisional Patent Application No. 62/289,703, titled "SYSTEMS AND METHODS FOR DYNAMICALLY RESTRICTING THE RENDERING OF UNAUTHORIZED CONTENT INCLUDED IN INFORMATION RESOURCES" and filed on Feb. 1, 2016, each of which are hereby incorporated by reference for all purposes.

BACKGROUND

In a computer networked environment, such as the Internet, content elements may be rendered by an application (e.g., web browser) on information resources (e.g., webpages). Each content element of the information resource may be transmitted via the computer networked environment from a different server to a computing device. One or more these different servers may be unauthorized to include content elements on information resources.

SUMMARY

At least one aspect is directed to a method of dynamically restricting rendering of unauthorized content included in information resources. A client device can identify an information resource including a content element specifying one or more graphical characteristics. The client device can determine that the content element corresponds to a restricted content element by applying at least one of an action-based detection policy to detect actions performed on the information resource or a visual-based detection policy to detect the graphical characteristics of the content element. The client device can modify, by applying a content rendering restriction policy, the information resource to alter rendering of the content element on the information resource responsive to determining that the first content element corresponds to the restricted content element by applying at least one of the action-based detection policy or the visual-based detection policy.

In some implementations, applying the action-based detection policy can further include identifying a regenerate command for a layout corresponding to the information resource, the regenerate command generated by the client device responsive to an insertion of a new content object onto a document tree generated based on the information resource, the new content object corresponding to the content element. In some implementations, applying the action-based detection policy can further include identifying a change in the one or more graphical characteristics of a content object of a document tree generated based on the information resource, the content object corresponding to the content element. In some implementations, applying the action-based detection policy can further include identifying a change in the one or more graphical characteristics of a content object of a document tree generated based on the information resource, the content object corresponding to the content element. In some implementations, applying the action-based detection policy can further include detecting a transmission of a pingback generated from instructions of the content element.

In some implementations, applying the visual-based detection policy can further include identifying a dimension or a position of the content element from the one or more graphical characteristics. In some implementations, applying the visual-based detection policy can further include determining that the dimension or the position of the content element matches one or more respective predesignated dimensions or one or more respective predesignated positions corresponding to dimensions or positions associated with content elements identified as restricted content elements.

In some implementations, applying the visual-based detection policy can further include identifying at least one character string on the content element by applying an optical character recognition algorithm on the content element. In some implementations, applying the visual-based detection policy can further include determining that at least one character string on the content element matches one or more predesignated restricted character strings corresponding to character strings associated with content elements identified as restricted content elements.

In some implementations, applying the visual-based detection policy can further include identifying a first color value of the content element from the one or more graphical characteristics of the first content element. In some implementations, applying the visual-based detection policy can further include identifying a second color value of a second content element of the information resource from one or more graphical characteristics of the second content element. In some implementations, applying the visual-based detection policy can further include calculating a color difference value between the first color value and the second color value. In some implementations, applying the visual-based detection policy can further include calculating a color difference value between the first color value and the second color value.

In some implementations, applying the content rendering restriction policy can further include deleting a content object from a document tree generated from the information resource, the content object corresponding to the first content element. In some implementations, applying the content rendering restriction policy can further include setting to null a display property of a style rule corresponding to a content object, the content object corresponding to the first content element. In some implementations, applying the content rendering restriction policy can further include inserting a second content element as an overlay over the first content element to restrict visibility of the first content element on a display of the client device.

At least one aspect is directed to a system for dynamically restricting rendering of unauthorized content included in information resource. The system can include a computing device having one or more processors. The computing device can identify an information resource including a content element specifying one or more graphical characteristics. The computing device can determine that the content element corresponds to a restricted content element by applying at least one of an action-based detection policy to detect actions performed on the information resource or a visual-based detection policy to detect the graphical characteristics of the content element. The computing device can modify, by applying a content rendering restriction policy, the information resource to alter rendering of the content element on the information resource responsive to determining that the first content element corresponds to the restricted content element by applying at least one of the action-based detection policy or the visual-based detection policy.

In some implementations, the computing device can apply the action-based detection policy by identifying a regenerate command for a layout corresponding to the information resource, the regenerate command generated by the client device responsive to an insertion of a new content object onto a document tree generated based on the information resource, the new content object corresponding to the content element. In some implementations, the computing device can apply the action-based detection policy by identifying a change in the one or more graphical characteristics of a content object of a document tree generated based on the information resource, the content object corresponding to the content element. In some implementations, the computing device can apply the action-based detection policy by detecting a transmission of a pingback generated from instructions of the content element.

In some implementations, the computing device can apply the visual-based detection policy by identifying dimension or a position of the content element from the one or more graphical characteristics. In some implementations, the computing device can apply the visual-based detection policy by determining that the dimension or the position of the content element matches one or more respective predesignated dimensions or one or more respective predesignated positions corresponding to dimensions or positions associated with content elements identified as restricted content elements.

In some implementations, the computing device can apply the visual-based detection policy by identifying at least one character string on the content element by applying an optical character recognition algorithm on the content element. In some implementations, the computing device can apply the visual-based detection policy by determining that at least one character string on the content element matches one or more predesignated restricted character strings corresponding to character strings associated with content elements identified as restricted content elements.

In some implementations, the computing device can apply the visual-based detection policy by identifying a first color value of the content element from the one or more graphical characteristics of the first content element. In some implementations, the computing device can apply the visual-based detection policy by identifying a second color value of a second content element of the information resource from one or more graphical characteristics of the second content element. In some implementations, the computing device can apply the visual-based detection policy by calculating a color difference value between the first color value and the second color value. In some implementations, the computing device can apply the visual-based detection policy by determining that a color difference value is above a predetermined threshold color value.

In some implementations, the computing device can apply the content rendering restriction policy by deleting a content object from a document tree generated from the information resource, the content object corresponding to the first content element. In some implementations, the computing device can apply the content rendering restriction policy by setting to null a display property of a style rule corresponding to a content object of an object model generated from the information resource, the content object corresponding to the first content element. In some implementations, the computing device can apply the content rendering restriction policy by inserting a second content element as an overlay over the first content element to restrict visibility of the first content element on a display of the client device.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
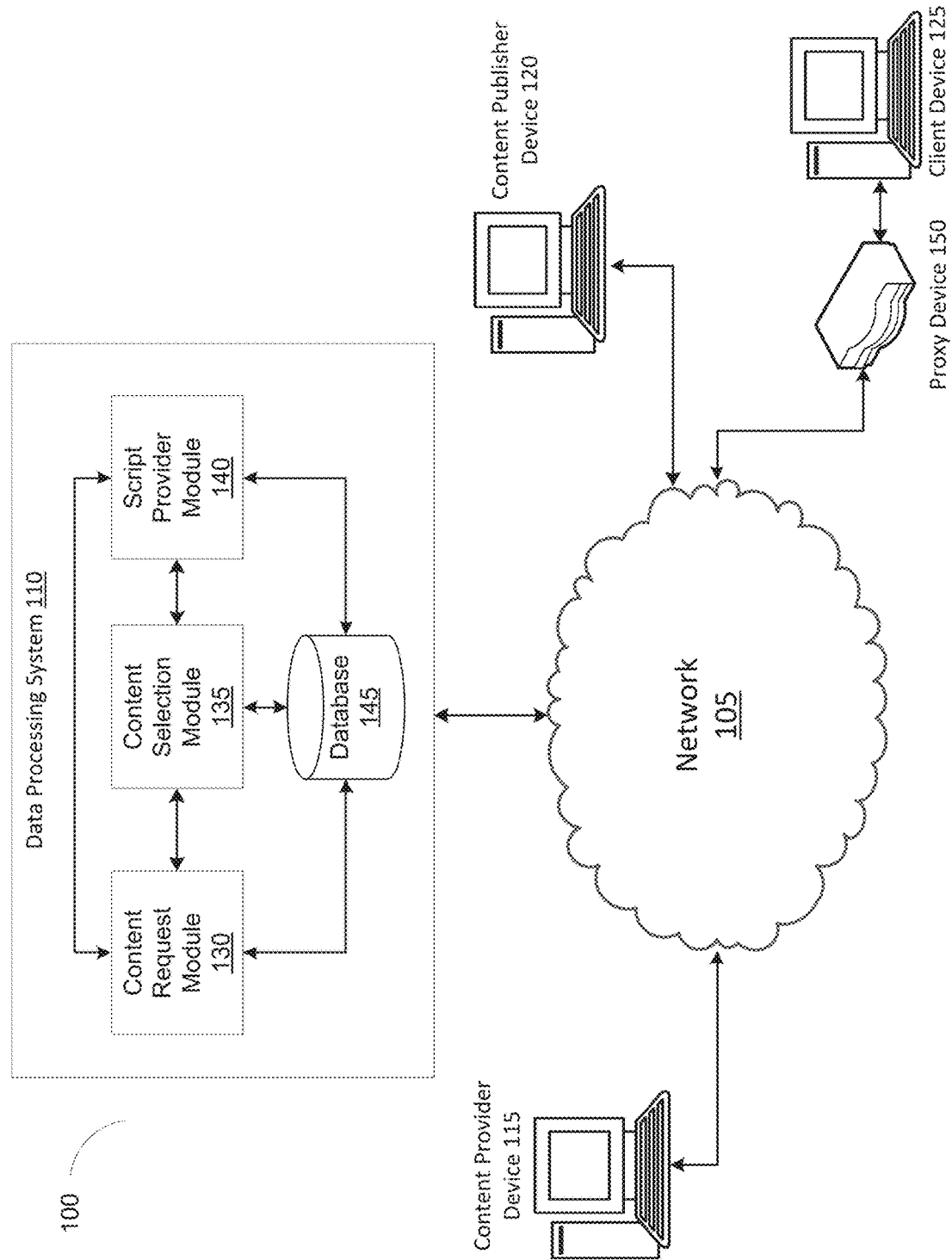
FIG. 1 is a block diagram depicting one implementation of an environment for dynamically restricting rendering of unauthorized content included in information resources in a computer network environment, according to an illustrative implementation.

Following below are more detailed descriptions of various concepts related to, and implementations of, methods, apparatuses, and systems of dynamically restricting rendering of unauthorized content included in information resources in a computer network environment. The various concepts introduced above and discussed in greater detail below may be implemented in any of numerous ways, as the described concepts are not limited to any particular manner of implementation.

Information resources (e.g., webpages) can include one or more content elements (e.g., inline frames, images, and sections, among others). Content elements can define the visual content makeup of the information resource. For example, the information resource can include primary content (e.g., body text) and a content element including an image. An application (e.g., web browser) can use such content elements to process, render, and display the information resource on a display of a computing device. Some of these content elements may originate from a server different from the server providing the information resource. As such, information resources with such content elements may suffer from security vulnerabilities. For example, a proxy network device may intercept the content elements originally intended for the information resource and replace the intercepted ones with its own content elements. Such content elements may include malicious code such as Trojans and viruses. In addition, from a human-computer interaction (HCI), these content elements may interfere with the user's ability to read or view the primary content of the information resource, even without the injection of malicious code. For instance, one content element may be of a color different from all the remaining content elements on the information resource, thereby causing the user to be distracted from the primary content or other content elements.

To mitigate some of these potential harms, content publishers may include instructions to cause the client device to request content from the host server hosting the information resource instead of one or more other content servers. This implementation, however, may not be able to address the scenarios in which content publishers themselves have inserted content elements that may interfere with the user's experience with the primary content on the displayed information resource.

To address these and other challenges, the present disclosure provides systems and methods for dynamically restricting the rendering of content elements included in information resources. In one implementation, an application render restrictor operating on a client device or a proxy device (e.g., router) can identify one or more content elements on the information resource. For each content element, the application render restrictor may apply a domain-based, visual-based, or action-based detection policy to detect whether the content element is a restricted content element (that may be prevented from being displayed). With the domain-based policy, the application render restrictor can determine whether any of the content elements of the information resource include redirect addresses that may be restricted. With the visual-based detection policy, the application render restrictor can apply various visual recognition algorithms to determine whether any of the content elements are restricted. With the action-based detection policy, the application render restrictor can detect any restricted processes or transmissions caused by the application processing any of the content elements of the information resource. Using these policies, application render restrictor can authenticate whether all of the content objects of the document tree, style rules of the object model, nodes of the rendering tree, or sub-layouts of the layout for the information resource.

FIG. 1 is a block diagram depicting one implementation of an environment for deploying countermeasures against unauthorized scripts interfering with the rendering of content elements on information resources in a computer network environment. The environment 100 includes at least one data processing system 110. The data processing system 110 can include at least one processor and a memory, i.e., a processing circuit. The memory stores processor-executable instructions that, when executed by processor, cause the processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language. The data processing system can include one or more computing devices or servers that can perform various functions. In some implementations, the data processing system can include an advertising auction system configured to host auctions. In some implementations, the data processing system does not include the advertising auction system but is configured to communicate with the advertising auction system via the network 105.

The network 105 can include computer networks such as the internet, local, wide, metro or other area networks, intranets, satellite networks, other computer networks such as voice or data mobile phone communication networks, and combinations thereof. The data processing system 110 of the system 100 can communicate via the network 105, for instance with at least one content provider computing device 115, at least one content publisher computing device 120, or at least one client device 125. The network 105 may be any form of computer network that relays information between the client device 125, data processing system 110, and one or more content sources, for example, web servers, advertising servers, amongst others. For example, the network 105 may include the Internet and/or other types of data networks, such as a local area network (LAN), a wide area network (WAN), a cellular network, satellite network, or other types of data networks. The network 105 may also include any number of computing devices (e.g., computer, servers, routers, network switches, etc.) that are configured to receive and/or transmit data within network 105. The network 105 may further include any number of hardwired and/or wireless connections. For example, the client device 125 may communicate wirelessly (e.g., via WiFi, cellular, radio, etc.) with a transceiver that is hardwired (e.g., via a fiber optic cable, a CAT5 cable, etc.) to other computing devices in network 105. The client device 125 may also communicate wireless with the computing devices of the network 105 via a proxy device 150 (e.g., router, network switch, or gateway).

The content provider computing devices 115 can include servers or other computing devices operated by a content provider entity to provide content elements to the content publisher computing devices 120 or the data processing system 110. The content provided by the content provider computing device 115 can include third party content elements for display on information resources, such as a website or web page that includes primary content, e.g. content provided by the content publisher computing device 120. The content elements can also be displayed on a search results web page. The content elements associated with the content provider computing device 115 can be displayed on information resources other than web pages, such as content displayed as part of the execution of an application on a smartphone or other client device 125. The content publisher computing devices 120 or the data processing system 110 in turn can select the content elements of the content provider computing devices 115. For example, the data processing system 110 can run an ad auction to select the content elements based on various performance metrics of the respective content elements. The content publisher computing devices 120 or the data processing system can transmit the selected content elements of the content provider computing devices for display on information resources at the client devices 125.

The content publisher computing devices 120 can include servers or other computing devices operated by a content publishing entity to provide primary content for display via the network 105. For instance, the content publisher computing device 120 can include a web page operator who provides primary content for display on the web page. The content publisher computing devices 120 can also provide third party content received from the content provider computing devices 115 for display via the network 105. The primary content can include content other than that provided by the content publisher computing device 120, and the web page can include content slots configured for the display of content elements received by the content publisher computing devices 120 from the content provider computing devices 115. For instance, the content publisher computing device 120 can operate the website of a company and can provide content about that company for display on web pages of the website. The web pages can include content slots configured for the display of content elements such as images, text, videos, or any combination thereof received from the content provider computing device 115. In some implementations, the content publisher computing device 120 includes a search engine computing device (e.g. server) of a search engine operator that operates a search engine website. The primary content of search engine web pages (e.g., a results or landing web page) can include results of a search as well as third party content elements displayed in content slots such as content elements from the content provider computing device 115. In some implementations, the content publisher computing device 120 can include a server for serving video content.

In some implementations, the content publisher computing devices 120 can select one or more content elements received from the content publisher computing devices 120 to include in an information resource with the primary content for display via the network 105. The content publisher computing devices 120 can transmit to client devices 125 content elements received from the content publisher computing devices 115 along with the primary content, responsive to a request for content from the client devices 125. In some implementations, subsequent to transmitting the primary content, the content publisher computing devices 120 can transmit to the client devices 125 content elements received from the content publisher computing devices 115, responsive to a request for additional content from the client devices 125. For example, the content publisher computing device 120 can receive an initial request for primary content from a client device 125 and in response transmit an information resource including primary content to the client device. Subsequent to the client device 125 detecting a dynamic event (e.g., change in scroll length of a webpage), the content publisher computing device 120 can receive a request for additional content and in turn provide content elements cached at the content publisher computing device 120 and received from the content provider computing devices 115.

The client devices 125 can include computing devices configured to communicate via the network 105 or via the network 105 through the proxy device 150 to display data such as the content provided by the content publisher computing device 120 (e.g., primary web page content or other information resources) and the content provided by the content provider computing device 115 (e.g., content elements configured for display in an information resource). The client device 125, the content provider computing device 115, and the content publisher computing device 120 can include desktop computers, laptop computers, tablet computers, smartphones, personal digital assistants, mobile devices, consumer computing devices, servers, clients, digital video recorders, a set-top box for a television, a video game console, or any other computing device configured to communicate via the network 105. The client device 125 can be communication devices through which an end user can submit requests to receive content. The requests can be requests to a search engine and the requests can include search queries. In some implementations, the requests can include a request to access a web page.

The proxy device 150 can include computing devices deployed between the client device 125 and the network 105. The proxy device 150 can be configured to communicate with one or more other computing devices, such as the data processing system 110, content provider devices 115, and content publisher devices 125 via the network 105. The proxy device 150 can be, for example, a router, network switch, gateway, network node, or any other computing device configured to receive and forward data packets from the client device 125 to the network 105 or from the network 105 to the client device 125.

The content provider computing devices 115, the content publisher computing device 120 and the client device 125 can include a processor and a memory, i.e., a processing circuit. The memory stores machine instructions that, when executed by processor, cause processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language.

The content provider computing devices 115, the content publisher computing devices 120, and the client device 125 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the content provider computing devices 115, the content publisher computing device 120 and the client device 125 (e.g., a built-in display, microphone, etc.) or external to the housing of content provider computing devices 115, the content publisher computing device 120 and the client device 125 (e.g., a monitor connected to the client device 115, a speaker connected to the client device 115, etc.), according to various implementations. For example, the content provider computing devices 115, the content publisher computing device 120 and the client device 125 may include an electronic display, which visually displays web pages using webpage data received from one or more content sources and/or from the data processing system 110 via the network 105.

The data processing system 110 can include at least one server. For instance, the data processing system 110 can include a plurality of servers located in at least one data center or server farm. In some implementations, the data processing system 110 includes a content placement system, e.g., an ad server or ad placement system. The data processing system 110 can include at least one content request module 130, at least one content selection module 135, at least one script provider module 140, and at least one database 145. The content request module 130, the content selection module 135, and the script provider module 140 each can include at least one processing unit, server, virtual server, circuit, engine, agent, appliance, or other logic device such as programmable logic arrays configured to communicate with the database 145 and with other computing devices (e.g., the content provider computing device 115, the content publisher computing device 120, or the client device 125) via the network 105.

The content request module 130, the content selection module 135, the script provider module 140, and the format prioritization module 145 can include or execute at least one computer program or at least one script. The content request module 130, the content selection module 135, and the script provider module 140 can be separate components, a single component, or part of the data processing system 110. The content request module 130, the content selection module 135, and the script provider module 140 can include combinations of software and hardware, such as one or more processors configured to execute one or more scripts.

The data processing system 110 can also include one or more content repositories or databases 145. The databases 145 can be local to the data processing system 110. In some implementations, the databases 145 can be remote to the data processing system 110 but can communicate with the data processing system 110 via the network 105. The databases 145 can include web pages, content elements (e.g., advertisements), and content formatting script, among others, to serve to a client device 125. In some implementations, information resources and content elements of the information resources can include those illustratively depicted in FIG. 2B. Additional details of the contents of the database 145 will be provided below.

The content request module 130 can receive a request for content from the client device 125. The request for content can include a request for an information resource or a request for content element for the information resource. The request for content can include a device identifier corresponding to the client device 125. The request for content can include an application profile identifying an application executing on the client device 125. The request for content can include an identifier for the information resource or the content element. For example, the request for content can include Uniform Resource Locator (URL) referring to a specific resource such as a webpage (e.g., "www.example.com/homepage.html"). The host name of the URL for the information resource may differ from the host name of the URL for the content element. For example, the URL for the information resource can be "www.example_publisher.com/index.html" but the URL for the content element can be "www.example_thirdparty.com/content_item_271828.html." The URL for a request for a content element can include a host page same as the URL for the information resource. For example, the URL for the information resource can be "www.example.com/index.html" but the URL for the content element can be "www.example.com/content_item_978.html."

In some implementations, the request for content can include an indicator indicating a request for a content formatting script. For example, the request for the information resource can include a header including an indicator specifying the script provider module 135 or the content publisher computing device 120 to send the content formatting script along with the information resource to the client device 125. In some implementations, the information resource can include the content formatting script inserted in the script or markup for the information resource. In some implementations, the information resource can include a script for retrieving the content formatting script for later insertion into the information resource.

The content selection module 135 or the content publisher computing device 120 can determine the content to transmit to the client device 125. The content selection module 135 or the content publisher computing device 120 can identify the address or identifier for the information resource and the content element included in the request for content. The content selection module 135 can access the database 145 and select the information resource or the content element identified by the address or identifier. The content selection module 135 can transmit a request to the content provider 115 or the content publisher 120 to access, retrieve, or otherwise receive the information resource or content element identified by the address or identifier.

In some implementations, the content selection module 135 can transmit the content to the client device 125 on behalf of one or more content publisher computing devices 120. The content selection module 135 can transmit or forward the information resource or content element identified by the address or identifier to the client device 125. For example, the data processing system 110 can receive from a client device 125 a request for an information resource or the content element. The request may include an address referring to one of the content publishers 120. In this example, the content selection module 135 can forward the request for the information resource to the respective content publisher 120. Upon receiving the information resource from the respective content publisher 120, the content selection module 135 can forward the content document to the client device 125 that made the original request, along with the content formatting script. In some implementations, the content selection module 135 can generate the content for transmission to the content device 125. In some implementations, the content selection 135 can generate the information resource and one or more content elements to include in the information resource based on the request received from the client device 125. In some implementations, the content selection 135 can generate the content formatting script to include in the information resource. The content formatting script can be configured to cause the client device 125 to request one or more additional content elements for insertion into the information resource and transmit a pingback to the data processing system 100 indicating success of display of the respective content element at the client device 125.

In some implementations, a content publisher may configure their domains or website addresses such that requests to access information resources of the content publisher are redirected to a server of the data processing system 110. The content selection module 135 of the data processing system 110 can receive the request to access an information resource of the content publisher. In some implementations, the request can include a device identifier or other information that the content selection module 135 can use to select content that is relevant to a user of the client device from which the request was received. The content selection module 135 may access one or more servers of the content publisher that maintain content elements or servers of the data processing system 110 that maintain content elements on behalf of the content publisher. The content selection module 135 may then generate an information resource or modify an existing information resource to include content elements for display at the client device. Some of these content elements can be primary content items corresponding to the content publisher. However, in some implementations, the content elements can be advertisements that may be received from an ad server. The advertisements or other third-party content items can include an image and a source address to which to redirect client devices to responsive to receiving an interaction on the image. In some implementations, the source address can be an address of a server of a content provider. In some implementations, the image of the content item can include a link to the data processing system 110 or a server that provides the information resource to the client device. In some implementations, the link can be an encoded link that causes the client device to be redirected from the server that provides the information resource to the client device to a server of the content publisher that provided the content item to the content selection module for insertion into the information resource.

In some implementations, the content selection module 135 can receive the content element from an ad auction system that can select the content element for display based on an ad auction. The ad auction system can select an ad from a plurality of ads based on ad auction parameters, such as bid values, size of ad, click-through rate (CTR), cost per mille (CPM), and impression rate, among others. The ad auction system can select the ad from the plurality of ads further based on size specifications of the respective ad and ad performance from previous presentation of the respective ad.

In some implementations, the content selection module 135 can select a plurality of formats for each content element on an information resource based on the identified device identifier or the application profile from the request for content. The content selection module 135 can determine a prioritization order specifying a selection sequence of the plurality of formats for processing by a computing device. The content selection module 135 can include, insert, embed, or otherwise append the prioritization order and the plurality of formats in the information resource to be sent to the client device 125. In some implementations, the content selection module 135 can maintain the prioritization order in the database 145.

The script provider module 140 can receive a request for the content formatting script from the content publisher computing device 120 or the content provider computing device 115 for insertion into an information resource or content element to be provided to the client device 125. The script provider module 140 can, responsive to receiving the request for the content formatting script from the content publisher computing device 120 or the content provider computing device 115, transmit the content formatting script to the content publisher computing device 120 or the content provider computing device 115 for inclusion, insertion, embedding, or appending the content formatting script into the information resource or the content element. In some implementations, the script provider module 140 can transmit the information resource or the content element including the content formatting script to the client device 125, responsive to the request for the content formatting script from the content publisher computing device 120 or the content provider computing device 115. In some implementations, the script provider module 140 can receive a request for the content formatting script from the client device 125 along with a request for content. The script provider module 140 can transmit the content formatting script to the client device 125. In some implementations, the script provider module 140 can include, insert, embed, or otherwise append the content formatting script into the information resource or the content element to be transmitted to the client device 125. In some implementations, the script provider module 140, in conjunction with the other modules of the data processing system 110, can transmit the information resource or the content element with the content formatting script embedded to the client device 125.

In some implementations, the script provider module 140 can receive a request for an up-to-date version of the content formatting script from the content publisher computing device 120 or the content provider computing device 115. For example, the script provider module 140 can periodically receive a request for the content formatting script from the content publisher computing device 120 or the content provider computing device 115, and in response transmit the most up-to-date version of the content formatting script. In turn, the content publisher computing device 120 or the content provider computing device 115 can insert or otherwise embed the updated content formatting script into one or more information resources. In this example, when the content publisher computing device 120 or the content provider computing device 115 receives a request for an information resource from the client device 125, the content publisher computing device 120 or the content provider computing device 115 transmit the respective information resource or content element along with the content formatting script to the client device 125.

Figure 2A:
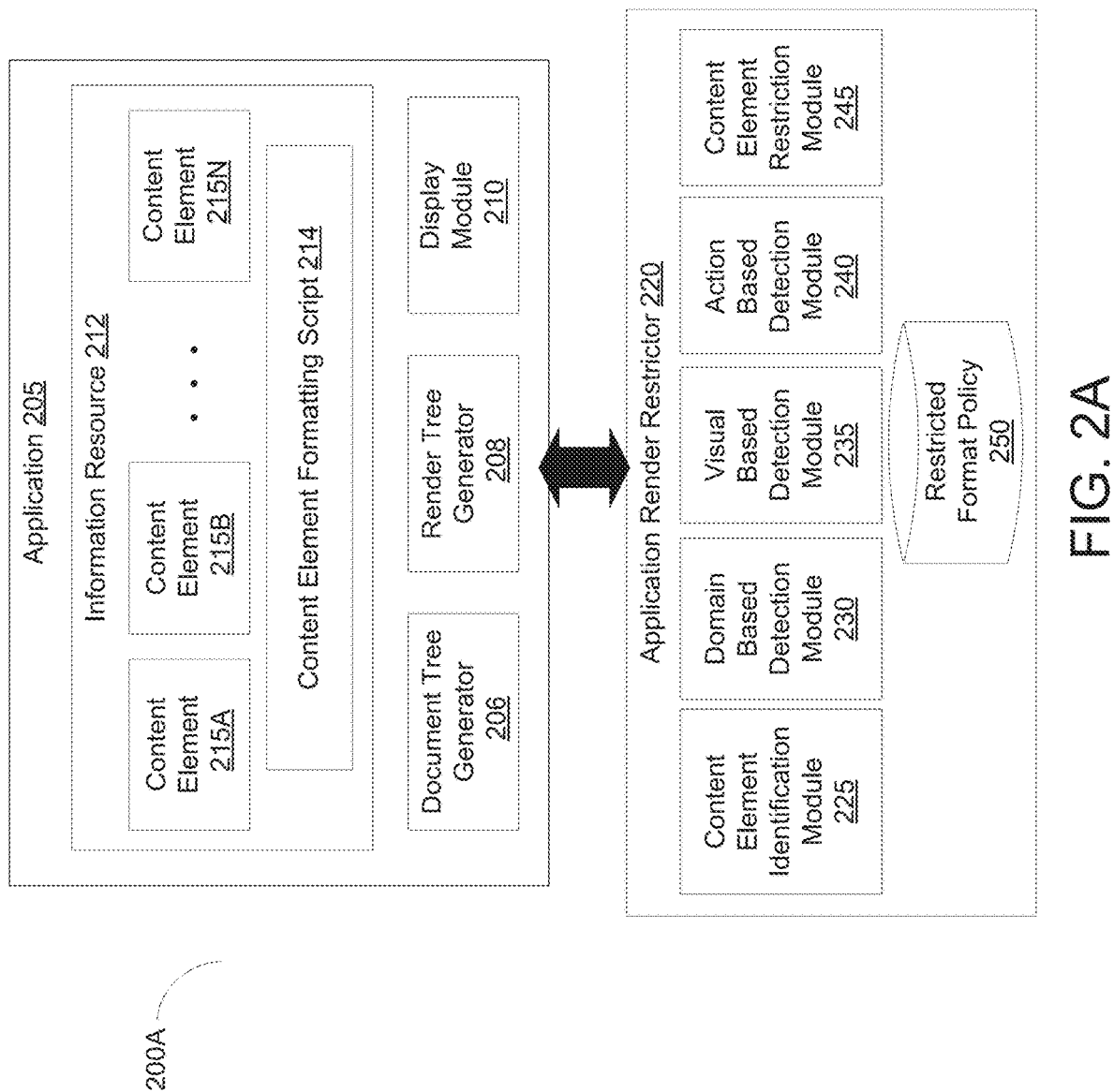
FIG. 2A is a block diagram depicting one implementation of a computing device including an application render restrictor system, according to an illustrative implementation.

Referring to FIG. 2A, FIG. 2A is a block diagram depicting one implementation of a computing device (e.g., client device 125) in an application render restriction system 200A, according to an illustrative implementation. In brief overview, the application render restriction system 200A can include a client device 125, an application 205 (e.g., web browser), an information resource 212 (e.g., web page), and an application render restrictor 220. The application 205 can include, for example, an Internet browser, mobile application, or any other computer program capable of executing or otherwise invoking computer-executable instructions processed by the client device 125, such as the computer-executable instructions included in the information resource 212, one or more content elements 215A-N, or the content formatting script 214. The application 205 can include a document tree generator 206, rendering tree generator 208, and display module 210. The information resource 212 can include one or more content elements 215A-N and a content formatting script 214. Each of the one or more content elements 215A-N can include one or more formats. The application render restrictor 220 can be a script or computer program on the application 205 (e.g., plug-in for a web browser), another application, computer program, or process running on the client device 125, or an application, computer program, or process running on another device such as the proxy device 150. The application render restrictor 220 can include a content element identification module 225, domain-based detection module 230, visual-based detection module 235, action-based detection module 240, content render restriction module 245, and a restricted format policy database 250. The restricted format policy database 250 may maintain a domain-based detection policy, a visual-based detection policy, an action-based detection policy, and a content rendering restriction policy used by the various modules of the application render restrictor 220 to find and modify restricted content elements.

In further detail, the information resource 212 and the one or more content elements 215A-N of the information resource 212 can be received via the network 105 from the data processing system 110, the content publisher computing device 115, or the content provider computing device 120. In some implementations, the information resource 212 and the one or more content elements 215A-N can be from the same source (e.g., the data processing system 110). In some implementation, the same source may be identified by a similar identifier. For example, the information resource 212 may correspond to the URL "www.example.com/index.html" whereas one of the content elements 215A-N corresponds to "www.example.com/q31.html." In this example, the host names in the URL for the information resource 212 and the content element 215A-N is the same. In some implementations, the information resource 212 and the one or more content elements 215A-N can be from the different sources identified by different identifiers. For example, the information resource 212 may correspond to the URL.

The information resource 212 can include script, markup, or otherwise code processed by the application 205 and executed by the one or more processors of the client device 125. For example, the information resource 212 can include HyperText Markup Language (HTML), Extensible HyperText Markup Language (XHTML), Extensible Markup Language (XML), Cascading Style Sheets (CSS), and JAVASCRIPT, or any combination thereof. The information resource 212 can include one or more content elements 215A-N, one or more corresponding style rules, and the content formatting script 214. Each of the one or more content elements 215A-N can correspond to a segment of the code of the information resource 212. In some implementations, each of the content elements 215A-N can include an HTML element. An HTML element can include, for example, a heading, body, paragraph, division, section, inline frame, image, canvas, applet, script, audio, video, table, and list, among others. Each of the content elements 215A-N can include one or more formats. Each of the one or more formats of each of the content elements 215A-N can include a corresponding attribute. Examples of attributes for content elements 215A-N may include color, font, font size, font type, size, and position, among others. Each of the one or more style rules (e.g., CSS style rules) can specify one or more visual properties of the characteristic of the corresponding format of the respective the content element 215A-N. For example, the CSS style rule of the first format for the content element 215A can specify that any text of the first content element 215A is to be aligned to the center (e.g., "text-align: center"). In this example, the CSS style rule of the second format of the content element 215A can specify that any text of the first content element 215A is to be aligned to the right (e.g., "text-align: right"). The content formatting script 214 can select one or more formats for the one or more content elements 215A-N for processing and rendering by the one or more modules of the application 205.

Figure 2B:
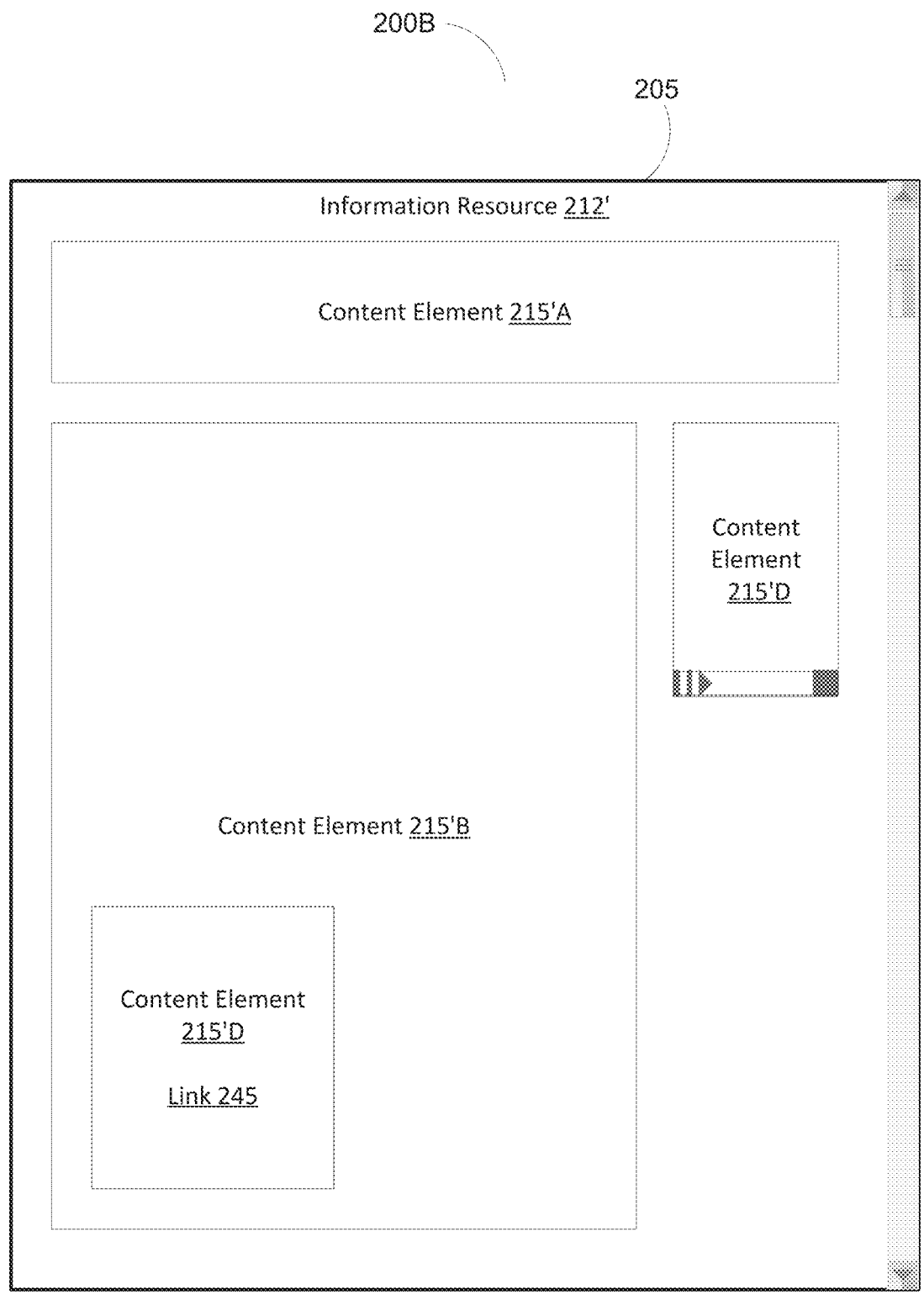
FIG. 2B is a block diagram depicting an information resource showing content elements of the information resource on an application, according to an illustrative implementation.

Referring to FIG. 2B, FIG. 2B is a block diagram depicting an information resource 212 showing content elements 215A-N on the application 205 displayed on the client device 125, according to an illustrative implementation. In brief overview, the example in FIG. 2B depicts a visual representation 200B of the information resource 212 processed and rendered by the display module 210 of the application 205 and displayed on the client device 125. In this example, the displayed information resource 212' can include four displayed content elements 215'A-215'D each corresponding to the respective content element 215A-D of the information resource 212. The first displayed content element 215'A can be, for example, a banner ad slot located generally across the top of the displayed information resource 212'. The second displayed content element 215'B can be, for example, a body text located generally in the middle of the displayed information resource 212'. The third displayed content element 215'C can be, for example, an inline frame including a video element toward the top right of the displayed information resource 212'. The fourth displayed content element 215'D can be, for example, an image including a link 245 generally located toward the bottom left of the displayed information resource 212'.

In the context of FIG. 2B, the content element formatting script 214 can be executed by the application 205 to dynamically change, modify, or update the formatting of each of the one or more content elements 215A-N of the information resource 212. In some implementations, the content element formatting script 214 can change, modify, or update the one or more content elements 215A-N of the information resource 212 arbitrarily or randomly. The application render restrictor 220 can in turn change, modify, or remove the display or rendering of the one or more content elements 215A-N based on a domain-based policy, visual-based policy, or an action-based policy, thereby causing an alteration in the behavior of the displayed information resource 212'. For example, the application render restrictor 220 can remove the content element 212C corresponding to the displayed video content element 212'C, thereby removing the content element 212'C from display. The functionalities of the application render restrictor 220 are detailed below.

The content element identification module 225 can identify the information resource 212 and the one or more content elements 215A-N included in the information resource 212. In some implementations, the content element identification module 225 can identify one or more code segments corresponding to the one or more content elements 215A-N included in the information resource 212. In some implementations, the content element identification module 225 can parse the information resource 212 to identify a content element type for each of the one or more content elements 215A-N. For example, the content element identification module 225 can identify that the information resource 215 includes an inline frame content element based on the HTML, tag "<iframe>." In some implementations, the element identification module 225 can parse the information resource 212 and can identify one or more function calls included in the information resource 212 for any of the one or more content elements 215A-N. For example, the element identification module 225 can search the script of the information resource 212 for a string corresponding to a function call.

Using the one or more content elements 215A-N identified by the content element identification module 225, the domain-based detection module 230 can determine whether any of the one or more content elements 215A-N is a restricted content element based on a domain-based detection policy. The domain-based detection policy may be maintained in the restricted format policy database 250. In some implementations, by applying the domain-based detection policy, the domain-based detection module 230 can identify a host address one of the one or more content elements 215A-N and a host address of the information resource 212. The domain-based detection module 230 can determine whether the host address of the identified content element 215A-N differs from the host address of the information resource 212. If the host addresses differ, the domain-based detection module 230 can determine that the respective content element 215A-N is a restricted content element. In some implementations, by applying the domain-based detection policy, the action-based detection module 240 can identify that one of one or more content elements 215A-N includes a link. The domain-based detection module 230 can determine that the link of the respective content element 215A-N includes an address different from the host address of the information resource.

Using the one or more content elements 215A-N identified by the content element identification module, the visual-based detection module 235 can determine whether any of the one or more content elements 215A-N is a restricted content element based on a visual-based detection policy. The visual-based detection policy may be maintained by the restricted format policy database 250. The visual-based detection module 235 can determine whether any of the one or more content elements 215A-N includes one or more restricted properties or attributes specified by the visual-based detection policy.

In some implementations, the visual-based detection module 235 can identify a dimension or a position of each of the content elements 215A-N from the one or more graphical properties or attributes of each of the content elements 215A-N of the information resource 212. In some implementations, the visual-based detection module 235 can determine that the dimension or the position of each of the content elements 215A-N of the information resource 212 matches one or more predesignated dimensions or one or more predesignated positions. The predesignated dimensions or predesignated positions may correspond to or be associated with content elements identified as restricted content elements. For example, pre-designated dimensions may be those of online ads, such as 468×60 pixels (full banner ads), 160×600 pixels (wide skyscraper banner ads), and 720×300 (pop-under ads), among others. Examples of pre-designated positions may include top alignments, left alignments, right alignments, and bottom alignments, among others.

In some implementations, the visual-based detection module 235 can identify a color value (e.g., RGB value, alphanumerical identifier, or HTML, color code) of each of the one or more content elements 215A-N from the graphical properties or attributes of the respective content element 215A-N. In some implementations, the visual-based detection module 235 can identify a color value of the information resource 212. The visual-based detection module 235 can calculate a difference in color value between one and one or more other content elements 215A-N. If the difference in color value between one of the content elements 215A-N versus the remaining content elements 215A-N is above a predetermined threshold, the visual-based detection module 235 can determine that the one content element 215A-N is a restricted content element. The visual-based detection module 235 can calculate a difference in color value between one of the content elements 215A-N and the information resource 212. If the difference in color value between the content element 215A-N and the information resource 212 is above a predetermined threshold, the visual-based detection module 235 can determine that the respective content element 215A-N is a restricted content element.

In some implementations, the visual-based detection module 235 can identify one or more characters from each of the one or more content elements 215A-N. The one or more characters may be from a text field or a metadata field of the respective content element 215A-N. In some implementations, the visual-based detection module 235 can determine whether the one or more characters identified from each of the one or more content elements 215A-N matches or is similar to one or more predesignated characters identified in restricted content elements. The one or more predesignated characters may be from the restricted format policy. In some implementations, the visual-based detection module 235 can determine or calculate a semantic similarity measure between the one or more characters identified from each of the one or more content elements 215A-N and the one or more predesignated characters. For example, the visual-based detection module 235 can apply an approximate string match algorithm to calculate the similarity measure. In some implementations, the visual-based detection module 235 can compare the semantic similarity measure to a threshold measure. In some implementations, the visual-based detection module 235 can identify the respective content element 215A-N having the one or more characters as a restricted content element, responsive to determining that the semantic similarity measure is greater than the threshold measure.

In some implementations, the visual-based detection module 235 can identify one or more image content elements 215A-N of the information resource 212 based on the content element type identified by the content element identification module 225. The visual-based detection module 235 can apply image recognition algorithms to determine whether the one or more image content elements 215A-N includes a restricted visual element. Examples of image recognition algorithms include optical character recognition, object recognition, edge detection, feature detection (e.g., affiant feature detection), image matching algorithms, and image pattern recognition algorithms, among others. In some implementations, the visual-based detection module 235 can identify one or more character strings from the image content element 215A-N by applying an optical character recognition algorithm. The visual-based detection module 235 can determine that at least one of the one more character strings matches one more predesignated character strings. The predesignated character strings can be maintained by the restricted format policy database 250 and can correspond to or be associated with character strings identified in restricted content elements. Examples of predesignated characters include "click here," "purchase," "sale," "xxx," and "$," among others. In some implementations, the visual-based detection module 235 can identify one or more visual features from the image content element 215A-N by applying feature detection or object recognition algorithms. In some implementations, the visual-based detection module 235 can determine that at least one of the one or more visual features matches one or more predesignated visual features. The predesignated visual features can be maintained by the restricted format policy database 250 and can correspond to or be associated with one or more visual features identified in restricted content elements. Examples of predesignated visual features can include user interface elements such as an exit button, minimize, or maximize button, among others.

Using the one or more content elements 215A-N identified by the content element identification module 225, the action-based detection module 240 can determine whether any of the one or more content elements 215A-N is a restricted content element based on an action-based detection policy. The action-based policy may be maintained by the restricted format policy database 250. The action-based policy may include a list of events, actions, and transmissions, among others used to determine restricted content elements. The action-based detection module 240 can identify the function call from the information resource 212 parsed by the content element identification module 225. In some implementations, by applying the action-based detection policy, the action-based detection module 240 can identify whether any of the one or more content elements 215A-N includes a function call that is restricted. For example, as depicted in FIG. 2B, the third content element 215C may include a function call to expand responsive to an event such as a mouse click. The action-based detection module 240 can determine that the function call is restricted by searching the action-based detection policy for a list of restricted function calls. Examples of restricted function calls include changes in graphical properties or attributes of the content element 215A-N, such as dimension, position, color, and font, among others. In some implementations, by applying the action-based detection policy, the action-based detection module 240 can determine that one of the one or more content elements 215A-N is a restricted content element. The restricted content element may be a pre-designated restricted type of content element. For example, the action-based detection policy may indicate that applet, audio, or visual content elements are not to be rendered by the application 205.

Responsive to determining that any one of the content elements 215A-N is a restricted content element, the content element restriction module 245 can apply a content rendering restriction policy. The content rendering restriction policy may be maintained by the restricted format policy database 250. The content element restriction module 245 can change, modify, or remove the respective content element 215A-N. In some implementations, the content element restriction module 245 can alter a portion of the script of the information resource 212 corresponding to the restricted content element. In the example depicted in FIG. 2B, the action-based detection module 240 can determine that link 245 of the fourth content element 215D includes a host address different from the information resource 212. In this example, the content element restriction module 245 can change the destination address of the link 245, remove the link 245 from the fourth content element 215D, or remove the fourth content element 215D entirely. In some implementations, the content element restriction module 245 can add an additional content element to the information resource 212 as an overlay to occlude or otherwise restrict visibility of the respective content element 215A-N. For example, in the example depicted in FIG. 2B, if the visual-based detection module 235 determines that the first content element 215'A is a restricted content element based on the dimension, position, or color tuple difference, the content element restriction module 245 can insert another content element with the same dimension and position but different color as an overlay to occlude or otherwise restrict visibility of the first content element 215'A.

The document tree generator 206 can process each of the one or more content elements 215A-N of the information resource 212 to generate a document tree. For example, the document tree generator 206 can parse the HTML markup of the information resource 212 to generate a Document Object Model (DOM) tree. The document tree can include one or more content objects associated with each other in a hierarchical manner. For example, two content objects in the DOM tree can have a parent-child relationship in a tree data structure. Each of the content objects can correspond to one format for one of the one or more content elements 215A-N. Each of the content objects in the document tree can include one or more properties or attributes. The generation of the document tree facilitates efficient and effective identification and modification of unauthorized content.

Figure 3A:
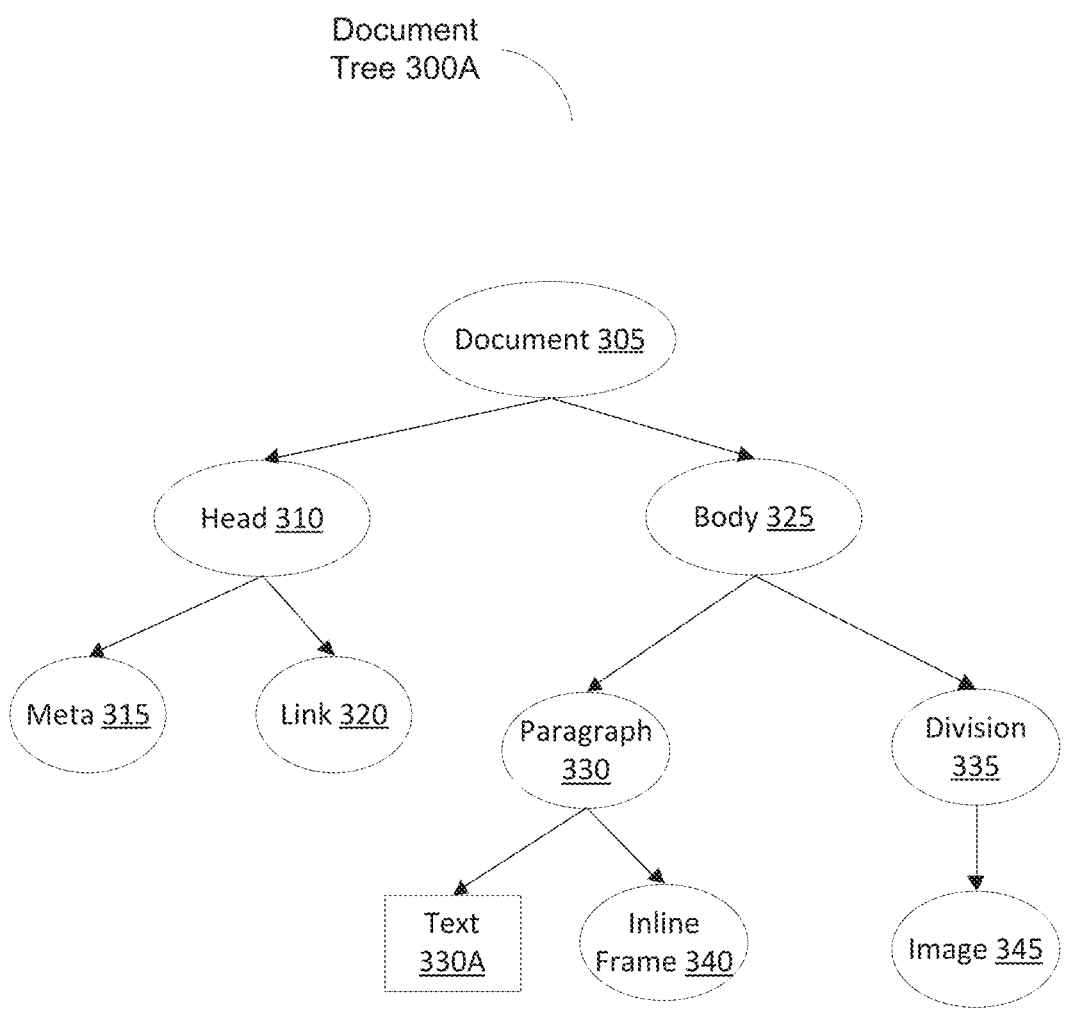
FIG. 3A is a block diagram depicting a document tree generated based on the information resource, according to an illustrative implementation.

Referring to FIG. 3A, FIG. 3A is a block diagram depicting a document tree 300A generated by the document tree generator 206 of the client device 125 based on the information resource 212, according to an illustrative implementation. In the example depicted in FIG. 3A, the document tree 300A can include a document content object 305, a head content object 310, body content object 325, meta content object 315, link content object 320, paragraph content object 330 including a text node 330A, division content object 335, an inline frame content object 340, and an image content object 345. In this example, the corresponding information resource 212 may have included a document content element (e.g., "<html>" tag), head content element (e.g., "<head>" tag), body content element (e.g., "<body>" tag), meta content element (e.g., "<meta>" tag), link content element (e.g., "<link>" tag), paragraph content element (e.g., "<p>" tag), division content element (e.g., "<div>" tag), inline frame content element (e.g., "<iframe>" tag), and an image content element (e.g., "<img>" tag). In this example, the document content object 305 located at the head of the document tree 300A can correspond to a document portion of the information resource 212. The head content object 310 can include descriptive data associated with the information resource 212. The meta content object 315 can include meta data associated with the information resource 212. The link content object 320 can include source specifier for style rules associated with the content elements 215A-N and the corresponding content objects for the information resource 212. The body content object 325 can define a body of the document portion (e.g., displayed content element 215'B) of the information resource 212. The paragraph content object 330 can include a text node 330 specifying inclusion of text for the information resource 212. The division content object 335 can define a separate division or section of the body of the document of the information resource 212. The inline frame content object 340 can define an inline frame to embed another content element 215A-N or another information resource into the information resource 212. The image content object 345 can define or reference an image to include into the information resource 212.

The content element identification module 225 can identify or access the document tree 300A generated by the document tree generator 206. In some implementations, the content element identification module 225 can identify the one or more content objects of the document tree 300A. The content element identification module 225 can a content object type of each of the one or more content objects in the document tree 300A. For example, as depicted in FIG. 3A, the content element identification module 225 can identify that content object 345 is an image content object. The content element identification module 225 can determine, for each of the one or more content elements 215A-N, a corresponding content object in the document tree 300A. The content element identification module 225 can identify one or more properties or attributes of each of the one or more content objects of the document tree 300A.

With the identified document tree 300A, the domain-based detection module 230 can efficiently determine whether any of the content objects of the document tree 300A is a restricted content object. The domain-based detection module 230 can apply a domain-based detection policy. The domain-based detection policy may be maintained by the restricted format policy database 250. In some implementations, the domain-based detection module 230 can traverse the document tree 300A. While traversing the document tree 300A, applying the domain-based detection policy, the domain-based detection module 230 can determine whether any of the one or more content objects is a restricted content object. In some implementations, applying the domain-based detection policy, the domain-based detection module 230 can determine whether any of the one or more content objects includes one or more restricted properties or attributes. In some implementations, applying the domain-based detection policy, the domain-based detection module 230 can determine whether any of the one or more content objects originates from a host different from the information resource 212 based on a host name for the content object and the host name for the information resource 212. In some implementations, applying the domain-based detection policy, the domain-based detection module 230 can determine whether any of the one or more content objects includes a link including a host name different from the host name of the information resource 212. For example, the domain-based detection module 230 can identify that the content object 330 include a link including a host name different from the information resource 212. Based on the difference in host names, the domain-based detection module 230 can determine that the content object 330 is a restricted content object.

With the identified document tree 300A, the visual-based detection module 235 can determine whether any of the content objects of the document tree 300A is a restricted content object. The visual-based detection module 235 can apply a visual-based detection policy. The visual-based detection policy may be maintained by the restricted format policy database 250. In some implementations, the visual-based detection module 235 can traverse the document tree 300A. While traversing the document tree 300A, applying the visual-based detection policy, the visual-based detection module 235 can determine whether any of the one or more content objects is a restricted content object.

In some implementations, applying the visual-based detection policy, the visual-based detection module 230 can determine whether any of the one or more content objects includes one or more restricted properties or attributes specified by the visual-based detection policy. In some implementations, the visual-based detection module 230 can identify a dimension or a position of the content element from the one or more graphical properties or attributes of each of the content objects of the document tree 300A. In some implementations, the visual-based detection module 230 can determine that the dimension or the position of each of the content object of the document tree 300A matches one or more predesignated dimensions or one or more predesignated positions. The predesignated dimensions or predesignated positions may correspond to or be associated with content elements identified as restricted content elements. For example, pre-designated dimensions may be those of online ads, such as 468×60 pixels (full banner ads), 160×600 pixels (wide skyscraper banner ads), and 720×300 (pop-under ads), among others. Examples of pre-designated positions may include top alignments, left alignments, right alignments, and bottom alignments, among others.

In some implementations, applying the visual-based detection policy, the visual-based detection module 235 can identify a color value (e.g., RGB value, alphanumerical identifier, or HTML, color code) of each of the one or more content objects from the graphical properties or attributes of the respective content object of the document tree 300A. In some implementations, the visual-based detection module 235 can identify a color value of the information resource 212 or from the document content object 305 of document tree 300A. The visual-based detection module 235 can calculate a difference in color value between one and one or more other content objects of the document tree 300A. If the difference in color value between one of the content objects versus the remaining content objects is above a predetermined threshold, the visual-based detection module 235 can determine that the one content objects is a restricted content object. The visual-based detection module 235 can calculate a difference in color value between one of the content objects and the information resource 212. If the difference in color value between the content object and the information resource 212 is above a predetermined threshold, the visual-based detection module 235 can determine that the respective content objects is a restricted content object.

In some implementations, the visual-based detection module 235 can identify one or more characters from each of the one or more content objects of the document tree 300A. The one or more characters may be from a text field or a metadata field of the respective content object. In some implementations, the visual-based detection module 235 can determine whether the one or more characters identified from each of the one or more content object matches or is similar to one or more predesignated characters identified in restricted content elements. The one or more predesignated characters may be from the restricted format policy. In some implementations, the visual-based detection module 235 can determine or calculate a semantic similarity measure between the one or more characters identified from each of the one or more content objects and the one or more predesignated characters. For example, the visual-based detection module 235 can apply an approximate string match algorithm to calculate the similarity measure. In some implementations, the visual-based detection module 235 can compare the semantic similarity measure to a threshold measure. In some implementations, the visual-based detection module 235 can identify the respective content object having the one or more characters as a restricted content element, responsive to determining that the semantic similarity measure is greater than the threshold measure.

In some implementations, the visual-based detection module 235 can identify one or more image content objects of the document tree 300A based on the content object type identified by the content element identification module 225. The visual-based detection module 235 can access or retrieve images associated with the one or more image content objects of the document tree 300A. The visual-based detection module 235 can apply image recognition algorithms to determine whether an image included in one or more image content objects (e.g., image content object 345 in FIG. 3A) includes a restricted visual element. Examples of image recognition algorithms include optical character recognition, object recognition, edge detection, feature detection (e.g., affiant feature detection), image matching algorithms, and image pattern recognition algorithms, among others. In some implementations, the visual-based detection module 235 can identify one or more character strings from the image content object by applying an optical character recognition algorithm. The visual-based detection module 235 can determine that at least one of the one more character strings matches one more predesignated character strings. The predesignated character strings can be maintained by the restricted format policy database 250 and can correspond to or be associated with character strings identified in restricted content elements. Examples of predesignated characters include "click here," "purchase," "sale," "xxx," and "$," among others. In some implementations, the visual-based detection module 235 can identify one or more visual features from the image content object by applying feature detection or object recognition algorithms. In some implementations, the visual-based detection module 235 can determine that at least one of the one or more visual features matches one or more predesignated visual features. The predesignated visual features can be maintained by the restricted format policy database 250 and can correspond to or be associated with one or more visual features identified in restricted content elements. Examples of predesignated visual features can include user interface elements such as an exit button, minimize, or maximize button, among others.

With the identified document tree 300A, the action-based detection module 240 can determine whether any of the content objects of the document tree 300A is a restricted content object. The action-based detection module 240 can apply an action-based detection policy. The action-based detection policy may be maintained by the restricted format policy database 250. In some implementations, the action-based detection module 240 can traverse the document tree 300A. While traversing the document tree 300A, applying the action detection policy, the action-based detection module 240 can determine whether any of the one or more content objects is a restricted content object. In some implementations, by applying the action-based detection policy, the action-based detection module 240 can determine that one of the one or more content objects of the document tree 300A is a restricted content element. The restricted content element may be a pre-designated restricted type of content element. For example, the action-based detection policy may indicate that applet, audio, or visual content elements are not to be rendered by the application 205.

Responsive to determining that any one of the content objects is a restricted content object, the content element restriction module 245 can apply a content rendering restriction policy. In some implementations, the content element restriction module 245 can change, modify, or remove the respective content object in the document tree 300A. In some implementations, the content element restriction module 245 can change, modify, or remove the content object in the document tree 300A. In the example depicted in FIG. 3A, the domain-based detection module 240 can determine that the text node 330A include a link that includes a host address different from the information resource 212. In this example, the content element restriction module 245 can change the destination address of the text node 330A, remove the link in the text of the text node 330A, or remove the text node 330A from the document tree 300A entirely. In some implementations, the content element restriction module 245 can add an additional content object to the document tree 300A as an overlay to occlude or otherwise restrict visibility of the respective content object when displayed by the client device 125. For example, with reference to FIG. 2B, if the visual-based detection module 235 determines that the content object of the document tree 300A corresponding to the first content element 215'A is a restricted content object based on the dimension, position, or color tuple difference, the content element restriction module 245 can insert another content object with the same dimension and position but different color as an overlay to occlude or otherwise restrict visibility of the first content element 215'A when displayed.

The document tree generator 206 can identify a subset of content objects of the document tree 300A that is to be rendered and a subset of content objects of the document tree 300A that is not to be rendered. In the example depicted in FIG. 3A, the subset of content objects to be rendered are content objects 325, 330, 335, and 345 and the subset of content objects not to be rendered are content objects 305, 310, 315, 320, and 340. The document tree generator 206 can identify the link content object 320 to import style rules (e.g., CSS style sheets) specified for the information resource 212. The document tree generator 206 can remove the subset of content objects that is not to be rendered from the document tree 300A. The document tree generator 206 can match each of the content objects in subset of the content objects that is to be rendered with the style rule specified in the information resource 212 to generate an object model.

Figure 3B:
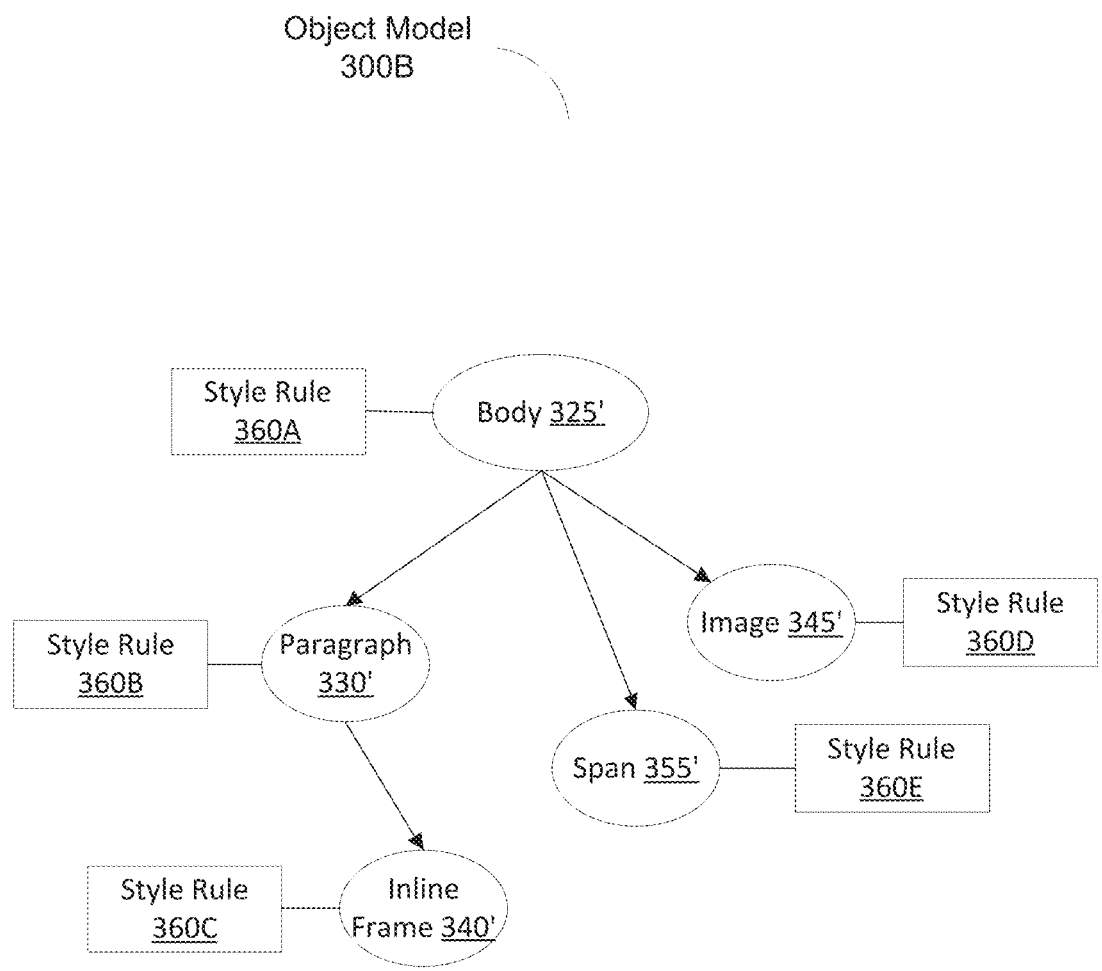
FIG. 3B is a block diagram depicting an object model with each content object matched to a style rule specified by the information resource, according to an illustrative implementation.

Referring to FIG. 3B, FIG. 3B is a block diagram depicting an object model 300B with each content object matched to a style rule by the document tree generator 206 based on the information resource 212, according to an illustrative implementation. In the example depicted in FIG. 3B, the object model 300B can include a body content object 325' matched with style rule 360A, a paragraph content object 330' matched with style rule 360B, inline frame content object 340' matched with style rule 360C, and image content object 345' matched with style rule 360D. Each of the style rules 360A-D can specify attributes or properties of the corresponding content objects 325', 330', 340', and 345'. For example, the style rule 360B can specify that the text appearing in paragraph content object 330' is to be colored red.

The content element identification module 225 can identify or access the object model 300B generated by the document tree generator 206. In some implementations, the content element identification module 225 can identify the one or more content objects of the object model 300B. The content element identification module 225 can a content object type of each of the one or more content objects in the object model 300B. For example, as depicted in FIG. 3A, the content element identification module 225 can identify that content object 345 is an image content object. The content element identification module 225 can determine, for each of the one or more content elements 215A-N, a corresponding content object in the object model 300B. The content element identification module 225 can identify one or more properties or attributes of each of the one or more content objects of the object model 300B.

With the identified object model 300B, the domain-based detection module 230 can determine whether any of the content objects of the object model 300B is a restricted content object. The domain-based detection module 230 can apply a domain-based detection policy. The domain-based detection policy may be maintained by the restricted format policy database 250. In some implementations, the domain-based detection module 230 can traverse the object model 300B. While traversing the object model 300B, applying the domain-based detection policy, the domain-based detection module 230 can determine whether any of the one or more content objects is a restricted content object. In some implementations, applying the domain-based detection policy, the domain-based detection module 230 can determine whether any of the one or more content objects includes one or more restricted properties or attributes. In some implementations, applying the domain-based detection policy, the domain-based detection module 230 can determine whether any of the one or more content objects originates from a host different from the information resource 212 based on a host name for the content object and the host name for the information resource 212. In some implementations, applying the domain-based detection policy, the domain-based detection module 230 can determine whether any of the one or more content objects includes a link including a host name different from the host name of the information resource 212. For example, the domain-based detection module 230 can identify that the content object 330 include a link including a host name different from the information resource 212. Based on the difference in host names, the domain-based detection module 230 can determine that the content object 330 is a restricted content object.

With the identified object model 300B, the visual-based detection module 235 can determine whether any of the content objects of the object model 300B is a restricted content object. The visual-based detection module 235 can apply a visual-based detection policy. The visual-based detection policy may be maintained by the restricted format policy database 250. In some implementations, the visual-based detection module 235 can traverse the object model 300B. While traversing the object model 300B, applying the visual-based detection policy, the visual-based detection module 235 can determine whether any of the one or more content objects is a restricted content object based on the corresponding style rule in the object model 300B.

In some implementations, applying the visual-based detection policy, the visual-based detection module 230 can determine whether any of style rules 360A-D matched to the one or more content objects includes one or more restricted properties or attributes specified by the visual-based detection policy. In some implementations, the visual-based detection module 230 can identify a dimension or a position of the content element from the one or more graphical properties or attributes of the style rules matched to each of the content objects of the object model 300B. In some implementations, the visual-based detection module 230 can determine that the dimension or the position of each of the content object of the object model 300B matches one or more predesignated dimensions or one or more predesignated positions. The predesignated dimensions or predesignated positions may correspond to or be associated with content elements identified as restricted content elements. For example, pre-designated dimensions may be those of online ads, such as 468×60 pixels (full banner ads), 160×600 pixels (wide skyscraper banner ads), and 720×300 (pop-under ads), among others. Examples of pre-designated positions may include top alignments, left alignments, right alignments, and bottom alignments, among others.

In some implementations, applying the visual-based detection policy, the visual-based detection module 235 can identify a color value (e.g., RGB value, alphanumeric designator, or HTML color value) of each of the one or more content objects from the graphical properties or attributes of the style rules 360A-D matched to the respective content object of the object model 300B. In some implementations, the visual-based detection module 235 can identify a color value of the information resource 212 or from the body content object 325' of object model 300B. The visual-based detection module 235 can calculate a difference in color value between one and one or more other content objects of the object model 300B. If the difference in color value between one of the content objects versus the remaining content objects is above a predetermined threshold, the visual-based detection module 235 can determine that the one content objects is a restricted content object. The visual-based detection module 235 can calculate a difference in color value between one of the content objects and the information resource 212. If the difference in color value between the content object and the information resource 212 is above a predetermined threshold, the visual-based detection module 235 can determine that the respective content objects is a restricted content object.

In some implementations, the visual-based detection module 235 can identify one or more image content objects of the object model 300B based on the content object type identified by the content element identification module 225. The visual-based detection module 235 can access or retrieve images associated with the one or more image content objects of the object model 300B. The visual-based detection module 235 can apply image recognition algorithms to determine whether an image included in one or more image content objects (e.g., image content object 345 in FIG. 3A) includes a restricted visual element. Examples of image recognition algorithms include optical character recognition, object recognition, edge detection, feature detection (e.g., affiant feature detection), image matching algorithms, and image pattern recognition algorithms, among others. In some implementations, the visual-based detection module 235 can identify one or more character strings from the image content object by applying an optical character recognition algorithm. The visual-based detection module 235 can determine that at least one of the one more character strings matches one more predesignated character strings. The predesignated character strings can be maintained by the restricted format policy database 250 and can correspond to or be associated with character strings identified in restricted content elements. Examples of predesignated characters include "click here," "purchase," "sale," "xxx," and "$," among others. In some implementations, the visual-based detection module 235 can identify one or more visual features from the image content object by applying feature detection or object recognition algorithms. In some implementations, the visual-based detection module 235 can determine that at least one of the one or more visual features matches one or more predesignated visual features. The predesignated visual features can be maintained by the restricted format policy database 250 and can correspond to or be associated with one or more visual features identified in restricted content elements. Examples of predesignated visual features can include user interface elements such as an exit button, minimize, or maximize button, among others.

With the identified object model 300B, the action-based detection module 240 can determine whether any of the content objects of the object model 300B is a restricted content object. The action-based detection module 240 can apply an action-based detection policy. The action-based detection policy may be maintained by the restricted format policy database 250. In some implementations, the action-based detection module 240 can traverse the object model 300B. While traversing the object model 300B, applying the action detection policy, the action-based detection module 240 can determine whether any of the one or more content objects is a restricted content object. In some implementations, by applying the action-based detection policy, the action-based detection module 240 can determine that one of the one or more content objects of the object model 300B is a restricted content element. The restricted content element may be a pre-designated restricted type of content element. For example, the action-based detection policy may indicate that applet, audio, or visual content elements are not to be rendered by the application 205.

Responsive to determining that any one of the content objects is a restricted content object, the content element restriction module 245 can apply the content rendering restriction policy. The content element restriction module 245 can change, modify, or remove the respective content object or the style rule 360A-D matched to the content object in the object model 300B. In some implementations, the content element restriction module 245 can change, modify, or remove the content object or the style rule 360A-D matched to the content object in the object model 300B. In some implementations, the content element restriction module 245 can set a display property of a style rule matched to one of the content objects in the object model 300B to null. In some implementations, the content element restriction module 245 can add an additional content object with a corresponding matched style rule 360A-D to the object model 300B as an overlay to occlude or otherwise restrict visibility of the respective content object when displayed by the client device 125. For example, with reference to FIG. 2B, if the visual-based detection module 235 determines that the content object of the object model 300B corresponding to the first content element 215'A is a restricted content object based on the dimension, position, or color tuple difference, the content element restriction module 245 can insert another content object with the same dimension and position but different color as an overlay to occlude or otherwise restrict visibility of the first content element 215'A when displayed.

The rendering tree generator 208 can generate a rendering tree for rendering the information resource 212. The rendering tree generator 208 can include a layout engine, rendering engine, or any module, engine, or process of the application 205 to prepare rendering of the information resource 212 on a display of the client device 125. In some implementations, the rendering tree generator 208 can generate the rendering tree based on the object model 300B or the document tree 300A. In some implementations, the rendering tree generator 208 can generate one or more render properties for each of the content objects and the matched style rule 360A-D in the object model 300B. In some implementations, the rendering tree generator 208 can generate the one or more properties based on the properties or attributes specified in the respective content object in the document tree 300A or the matched style rule 360A-D in the object model 300B. The rendering tree can include one or more nodes associated with each other in a hierarchical manner. For example, two nodes can have a parent-child relationship in a tree data structure. Each of the nodes in the rendering tree can correspond to a content element 215A-N of the information resource 212 that is to be rendered. Each of the nodes in the render can be matched to one or more rendering properties.

Figure 3C:
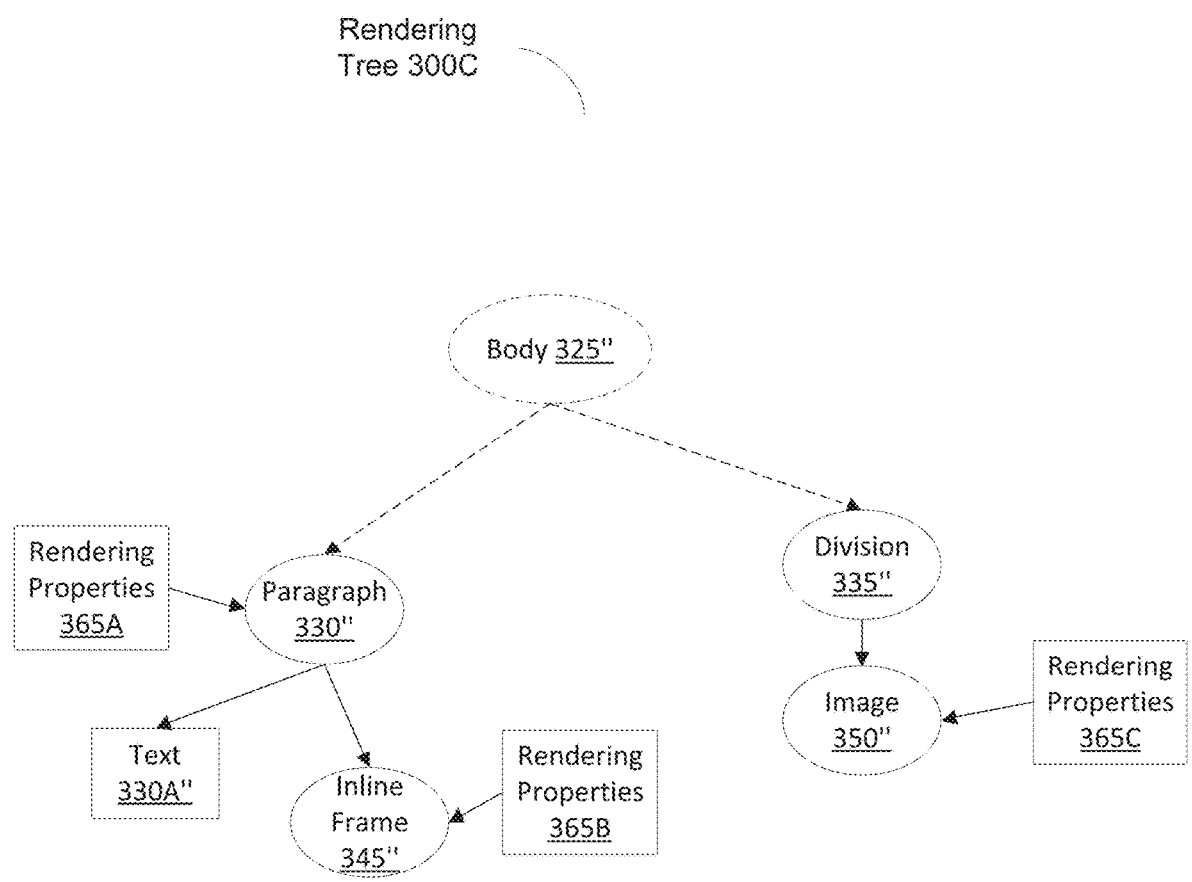
FIG. 3C is a block diagram depicting a rendering tree generated based on the document tree with each object matched to a style rule, according to an illustrative implementation.

Referring to FIG. 3C, FIG. 3C is a block diagram depicting a rendering tree 300C generated based on the object model 300B, according to an illustrative implementation. In the example depicted in FIG. 3C, the rendering tree 300C can include a body node 325", paragraph node 330", text node 330A", inline frame node 345", division node 335", and image node 350". The nodes of the rendering tree 300C may correspond to at least a subset of the content elements 215A-N of the information resource 212. Some of the nodes of the rendering tree 300C can have a rendering property 365A-C specifying rendering information for the respective node 330", 345", and 350". The rendering information of the rendering properties 365A-C can be applicable to the corresponding node and children node of the corresponding node. For example, the rendering information in rendering property 365A may be applicable to both paragraph node 330" and text node 330A".

The content element identification module 225 can identify or access the rendering tree 300C generated by the rendering tree generator 208. In some implementations, the content element identification module 225 can identify the one or more nodes of the rendering tree 300C. The content element identification module 225 can identify a node type of each of the one or more nodes in the rendering tree 300C. For example, as depicted in FIG. 3C, the content element identification module 225 can identify that node 345 is an image node. The content element identification module 225 can determine, for each of the one or more content elements 215A-N, a corresponding node in the rendering tree 300C. The content element identification module 225 can identify one or more properties or attributes of each of the one or more nodes of the rendering tree 300C.

With the identified rendering tree 300C, the visual-based detection module 235 can determine whether any of the nodes of the rendering tree 300C is a restricted node. The visual-based detection module 235 can apply a visual-based detection policy. The visual-based detection policy may be maintained by the restricted format policy database 250. In some implementations, the visual-based detection module 235 can traverse the rendering tree 300C. While traversing the rendering tree 300C, applying the visual-based detection policy, the visual-based detection module 235 can determine whether any of the one or more nodes is a restricted node. The visual-based detection module 235 can identify the one or more rendering properties for each of the nodes in the rendering tree 300C.

In some implementations, applying the visual-based detection policy, the visual-based detection module 230 can determine whether any of the one or more rendering properties corresponding to each of the one or more nodes includes one or more restricted properties or attributes specified by the visual-based detection policy. In some implementations, the visual-based detection module 230 can identify a dimension or a position of the content element from the one or more graphical properties or attributes of the one or more rendering properties for each of the nodes of the rendering tree 300C. In some implementations, the visual-based detection module 230 can determine that the dimension or the position of each of the node of the rendering tree 300C matches one or more predesignated dimensions or one or more predesignated positions. The predesignated dimensions or predesignated positions may correspond to or be associated with content elements identified as restricted content elements. For example, pre-designated dimensions may be those of online ads, such as 468×60 pixels (full banner ads), 160×600 pixels (wide skyscraper banner ads), and 720×300 (pop-under ads), among others. Examples of pre-designated positions may include top alignments, left alignments, right alignments, and bottom alignments, among others.

In some implementations, applying the visual-based detection policy, the visual-based detection module 235 can identify a color value (e.g., RGB value, alphanumerical identifier, or HTML, color code) from the one or more rendering properties for each of the one or more nodes from the graphical properties or attributes of the one or more rendering properties for the respective node of the rendering tree 300C. In some implementations, the visual-based detection module 235 can identify a color value of the information resource 212 or from the body node 325' of rendering tree 300C. The visual-based detection module 235 can calculate a difference in color value between one and one or more other nodes of the rendering tree 300C. If the difference in color value between one of the nodes versus the remaining nodes is above a predetermined threshold, the visual-based detection module 235 can determine that the one node is a restricted node. The visual-based detection module 235 can calculate a difference in color value between one of the nodes and the information resource 212. If the difference in color value between the node and the information resource 212 is above a predetermined threshold, the visual-based detection module 235 can determine that the respective node is a restricted node.

In some implementations, the visual-based detection module 235 can identify one or more image nodes of the rendering tree 300C based on the node type identified by the content element identification module 225. The visual-based detection module 235 can access or retrieve images associated with the one or more image nodes of the rendering tree 300C. The visual-based detection module 235 can apply image recognition algorithms to determine whether an image included in one or more image nodes (e.g., image node 345 in FIG. 3A) includes a restricted visual element. Examples of image recognition algorithms include optical character recognition, object recognition, edge detection, feature detection (e.g., affiant feature detection), image matching algorithms, and image pattern recognition algorithms, among others. In some implementations, the visual-based detection module 235 can identify one or more character strings from the image node by applying an optical character recognition algorithm. The visual-based detection module 235 can determine that at least one of the one more character strings matches one more predesignated character strings. The predesignated character strings can be maintained by the restricted format policy database 250 and can correspond to or be associated with character strings identified in restricted content elements. Examples of predesignated characters include "click here," "purchase," "sale," "xxx," and "$," among others. In some implementations, the visual-based detection module 235 can identify one or more visual features from the image node by applying feature detection or object recognition algorithms. In some implementations, the visual-based detection module 235 can determine that at least one of the one or more visual features matches one or more predesignated visual features. The predesignated visual features can be maintained by the restricted format policy database 250 and can correspond to or be associated with one or more visual features identified in restricted content elements. Examples of predesignated visual features can include user interface elements such as an exit button, minimize, or maximize button, among others.

With the identified rendering tree 300C, the action-based detection module 240 can determine whether any of the nodes of the rendering tree 300C is a restricted node. The action-based detection module 240 can apply an action-based detection policy. The action-based detection policy may be maintained by the restricted format policy database 250. In some implementations, the action-based detection module 240 can traverse the rendering tree 300C. While traversing the rendering tree 300C, applying the action detection policy, the action-based detection module 240 can determine whether any of the one or more nodes is a restricted node. In some implementations, by applying the action-based detection policy, the action-based detection module 240 can determine that one of the one or more nodes of the rendering tree 300C is a restricted content element. The restricted content element may be a pre-designated restricted type of content element. For example, the action-based detection policy may indicate that applet, audio, or visual content elements are not to be rendered by the application 205.

Responsive to determining that any one of the nodes is a restricted node, the content element restriction module 245 can apply the content rendering restriction policy. The content element restriction module 245 can change, modify, or remove the respective node or the respective one or more rendering properties in the rendering tree 300C. In some implementations, the content element restriction module 245 can change, modify, or remove the node or the respective one or more rendering properties in the rendering tree 300C. For example, the content element restriction module 245 can set a delete a node or a corresponding parent node from the rendering tree 300C. In some implementations, the content element restriction module 245 can add an additional node to the rendering tree 300C as an overlay to occlude or otherwise restrict visibility of the respective node when displayed by the client device 125. For example, with reference to FIG. 2B, if the visual-based detection module 235 determines that the node of the rendering tree 300C corresponding to the first content element 215'A is a restricted node based on the dimension, position, or color tuple difference, the content element restriction module 245 can insert another node with the same dimension and position but different color as an overlay to occlude or otherwise restrict visibility of the first content element 215' A when displayed.

The rendering tree generator 208 can process a layout based on the rendering tree 300C. The layout can include one or more sub-layouts in a list, array, or tree data structure. Each of the one or more sub-layouts can correspond to a node on the rendering tree 300C. Each of the one or more sub-layouts can include rendering information specifying how the node corresponding to one of the content elements 215A-N is to be rendered on a display of the client device 125. For example, a sub-layout may specify the absolute pixel positions a node is to occupy on the display. The rendering tree generator 208 can traverse the nodes of the rendering tree 300C. For each node traversed, the rendering tree generator 208 can generate the corresponding sub-layout based on the one or more rendering properties for the node. The display module 210 can additionally process the layout generated by the rendering tree generator 208 for displaying the information resource 212 on the client device 125.

The content element identification module 225 can identify or access the layout generated by the rendering tree generator 208. In some implementations, the content element identification module 225 can identify the one or more sub-layouts of the layout. The content element identification module 225 can be a sub-layout type of each of the one or more sub-layouts in the layout. For example, the content element identification module 225 can identify that one of the sub-layouts corresponds to an image sub-layout. The content element identification module 225 can determine, for each of the one or more content elements 215A-N, a corresponding sub-layout in the layout. The content element identification module 225 can identify one or more properties or attributes of each of the one or more sub-layouts of the layout.

With the identified layout, the visual-based detection module 235 can determine whether any of the sub-layouts of the layout is a restricted sub-layout. The visual-based detection module 235 can apply a visual-based detection policy. The visual-based detection policy may be maintained by the restricted format policy database 250. In some implementations, the visual-based detection module 235 can traverse the layout. While traversing the layout, applying the visual-based detection policy, the visual-based detection module 235 can determine whether any of the one or more sub-layouts is a restricted sub-layout. The visual-based detection module 235 can identify the one or more rendering properties for each of the sub-layouts in the layout.

In some implementations, applying the visual-based detection policy, the visual-based detection module 230 can determine whether any of the one or more rendering properties corresponding to each of the one or more sub-layouts includes one or more restricted properties or attributes specified by the visual-based detection policy. In some implementations, the visual-based detection module 230 can identify a dimension or a position of the content element from the one or more graphical properties or attributes of the one or more rendering properties for each of the sub-layouts of the layout. In some implementations, the visual-based detection module 230 can determine that the dimension or the position of each of the sub-layout of the layout matches one or more predesignated dimensions or one or more predesignated positions. The predesignated dimensions or predesignated positions may correspond to or be associated with content elements identified as restricted content elements. For example, pre-designated dimensions may be those of online ads, such as 468×60 pixels (full banner ads), 160×600 pixels (wide skyscraper banner ads), and 720×300 (pop-under ads), among others. Examples of pre-designated positions may include top alignments, left alignments, right alignments, and bottom alignments, among others.

In some implementations, applying the visual-based detection policy, the visual-based detection module 235 can identify a color value (e.g., RGB value, alphanumerical identifier, or HTML, color code) from the one or more rendering properties for each of the one or more sub-layouts from the graphical properties or attributes of the one or more rendering properties for the respective sub-layout of the layout. In some implementations, the visual-based detection module 235 can identify a color value of the information resource 212 or from the body sub-layout 325' of layout. The visual-based detection module 235 can calculate a difference in color value between one and one or more other sub-layouts of the layout. If the difference in color value between one of the sub-layouts versus the remaining sub-layouts is above a predetermined threshold, the visual-based detection module 235 can determine that the one sub-layout is a restricted sub-layout. The visual-based detection module 235 can calculate a difference in color value between one of the sub-layouts and the information resource 212. If the difference in color value between the sub-layout and the information resource 212 is above a predetermined threshold, the visual-based detection module 235 can determine that the respective sub-layout is a restricted sub-layout.

In some implementations, the visual-based detection module 235 can identify one or more image sub-layouts of the layout based on the sub-layout type identified by the content element identification module 225. The visual-based detection module 235 can access or retrieve images associated with the one or more image sub-layouts of the layout. The visual-based detection module 235 can apply image recognition algorithms to determine whether an image included in one or more image sub-layouts (e.g., image sub-layout 345 in FIG. 3A) includes a restricted visual element. Examples of image recognition algorithms include optical character recognition, object recognition, edge detection, feature detection (e.g., affiant feature detection), image matching algorithms, and image pattern recognition algorithms, among others. In some implementations, the visual-based detection module 235 can identify one or more character strings from the image sub-layout by applying an optical character recognition algorithm. The visual-based detection module 235 can determine that at least one of the one or more character strings matches one more predesignated character strings. The predesignated character strings can be maintained by the restricted format policy database 250 and can correspond to or be associated with character strings identified in restricted content elements. Examples of pre-designated characters include "click here," "purchase," "sale," "xxx," and "$," among others. In some implementations, the visual-based detection module 235 can identify one or more visual features from the image sub-layout by applying feature detection or object recognition algorithms. In some implementations, the visual-based detection module 235 can determine that at least one of the one or more visual features matches one or more predesignated visual features. The predesignated visual features can be maintained by the restricted format policy database 250 and can correspond to or be associated with one or more visual features identified in restricted content elements. Examples of predesignated visual features can include user interface elements such as an exit button, minimize, or maximize button, among others.

With the identified layout, the action-based detection module 240 can determine whether any of the sub-layouts of the layout is a restricted sub-layout. The action-based detection module 240 can apply an action-based detection policy. The action-based detection policy may be maintained by the restricted format policy database 250. In some implementations, the action-based detection module 240 can traverse the layout. While traversing the layout, applying the action detection policy, the action-based detection module 240 can determine whether any of the one or more sub-layouts is a restricted sub-layout. In some implementations, by applying the action-based detection policy, the action-based detection module 240 can determine that one of the one or more sub-layouts of the layout is a restricted content element. The restricted content element may be a pre-designated restricted type of content element. For example, the action-based detection policy may indicate that applet, audio, or visual content elements are not to be rendered by the application 205.

Responsive to determining that any one of the sub-layouts is a restricted sub-layout, the content element restriction module 245 can apply the content rendering restriction policy. The content element restriction module 245 can change, modify, or remove the respective sub-layout or the respective one or more rendering properties in the layout. In some implementations, the content element restriction module 245 can change, modify, or remove the sub-layout or the respective one or more rendering properties in the layout. In some implementations, the content element restriction module 245 can add an additional sub-layout to the layout as an overlay to occlude or otherwise restrict visibility of the respective sub-layout when displayed by the client device 125. For example, with reference to FIG. 2B, if the visual-based detection module 235 determines that the sub-layout of the layout corresponding to the first content element 215'A is a restricted sub-layout based on the dimension, position, or color tuple difference, the content element restriction module 245 can insert another sub-layout with the same dimension and position but different color as an overlay to occlude or otherwise restrict visibility of the first content element 215' A when displayed.

The display module 210 can process the altered document tree 300A, object model 300B, rendering tree 300C, or layout. In some implementations, subsequent to the content element restriction module 245 changing, modifying, or removing any of the content objects in the document tree 300A, the content objects or the matched style rules in the object model 300B, nodes of the rendering tree 300C, or sub-layouts of the layout, the display module 210 can process the document tree 300A, object model 300B, rendering tree 300C, or layout and render the information resource 212' for display on the client device 125.

Subsequent to the client device 125 displaying the information resource 212, the action-based detection module 240 can monitor for one or more processes of the application 205. In some implementations, the action-based detection module 240 can detect one or more function calls by the application 205 while processing the information resource 212. In some implementations, the content element formatting script 214 may cause changes to any of the one or more content elements 215A-N of the information resource 212, one or more content objects of the document tree 300A, one or more content objects or a matched style rule of the one or more content objects of the object model 300B, one or more nodes of the rendering tree 300C, or the sub-layouts of the layout, thereby resulting in one or more function calls in the application 205. For example, the content element formatting script 214 may modify the one or more content elements 215A-N from one format to another format by setting a different size, position, or color, among other visual characteristics.

In some implementations, the action-based detection module 240 can identify a change in the one or more graphical attributes or properties of the one or more content elements 215A-N of the information resource 212, one or more content objects of the document tree 300A, one or more content objects or a matched style rule of the one or more content objects of the object model 300B, one or more nodes of the rendering tree 300C, or the sub-layouts of the layout. In some implementations, the action-based detection module 240 can detect a regenerate command for the information resource 212. The regenerate command may be indicative of one or more changes or alterations in the rendering of the information resource 212 by the client device 125. In some implementations, the regenerate command may be generated by the application 205 of the client device 125 responsive to an insertion or addition of a new content element to the information resource 212, an insertion or addition of a new content object to the document tree 300A, an insertion or addition of a new content object or a change or modification in a style rule in the object model 300B, an insertion or addition of a new node or a change or modification in one or more rendering properties in the rendering tree 300C, or insertion or addition of a new sub-layout or a change or modification in one or more sub-layouts in the layout.

Responsive to detecting one or more processes of the application 205, the action-based detection module 240 can identify the one or more content elements 215A-N corresponding to or associated with the respective process. For example, the action-based detection module 240 can detect function calls made by an event listener and identify a button content element on the information resource 212 based on the detected function calls. In some implementations, the action-based detection module 240 can identify the one or more content elements 215A-N corresponding to or associated with the change in the one or more graphical attributes or properties of the one or more content elements 215A-N of the information resource 212, one or more content objects of the document tree 300A, one or more content objects or a matched style rule of the one or more content objects of the object model 300B, one or more nodes of the rendering tree 300C, or the sub-layouts of the layout. In some implementations, the action-based detection module 240 can identify the one or more content elements 215A-N, content objects of the document tree 300A, style rules of the object model 300B, nodes in the rendering tree 300C, and sub-layouts in the layout corresponding to or associated with the regenerate command.

In some implementations, responsive to identifying the one or more content elements 215A-N, content objects of the document tree 300A, style rules of the object model 300B, nodes in the rendering tree 300C, and sub-layouts in the layout, by applying the action-based detection policy, the action-based detection module 240 can determine whether the associated process is a restricted process. The action-based detection policy may list one or more processes that may be restricted. Examples of restricted processes include change in size, change in position, and change in color, among others. If the process is not a restricted process, the action-based detection module 240 can allow or permit the process to continue. In some implementations, the display module 210 of the application 205 can update the information resource with the process executed and display the newly updated information resource. If the process is a restricted process, the action-based detection module 240 can terminate the process. In some implementations, the action-based detection module 240 can interface with the domain-based detection module 230 or the visual-based detection module 235 to determine whether the process is permitted by repeating previously described functionalities.

Responsive to determining that the process is not permitted, the action-based detection module 240 can modify, change, or remove the respective content elements 215A-N. In some implementations, responsive to determining that the process is not permitted, the action-based detection module 240 can modify, change, or remove the identified one or more content objects of the document tree 300A, one or more content objects or a matched style rule of the one or more content objects of the object model 300B, one or more nodes of the rendering tree 300C, or the sub-layouts of the layout. For example, if a change in size is detected for one of the nodes of the rendering tree, the action-based detection module 240 can identify the previous size from the previous rendering properties for the respective node. In this example, the action-based detection module 240 can set the size to the previous size.

In some implementations, the action-based detection module 240 can monitor for one or more transmissions from the client device 125 caused by the application 205. The one or more transmissions can include a pingback generated from the instructions for one or more of the content elements 215A-N. In some implementations, the action-based detection module 240 can detect a request from the one or more transmissions from the client device 125. The request can include a request for another information resource or a request for additional content elements, among others. For example, if the action-based detection module 240 resided in the proxy device 150, the action-based detection module 240 can intercept the one or more transmissions from the client device 125 and detect a request from the one or more transmissions. In some implementations, the action-based detection module 240 can identify the one or more content elements 215A-N corresponding to or associated with the transmission of the pingback or request. In some implementations, the action-based detection module 240 can change, modify, or otherwise remove the one or more content elements 215A-N corresponding to or associated with the transmission of the pingback or request. For example, the pingback or request may include an identifier of the respective content element 215A-N. Using the identifier, the action-based detection module 240 can identify the respective content element 215A-N.

The application render restrictor 220 including the content element identification module 225, the domain-based detection module 230, the visual-based detection module 235, action-based detection module 240, and the content element restriction module 245 can repeat the above detailed functionality any number of times. For example, the application render restrictor 220 can iteratively re-run the functionalities of the content element identification module 225, the domain-based detection module 230, the visual-based detection module 235, action-based detection module 240, and the content element restriction module 245 for each of the content elements 215A-N of the information resource 212. In addition, the application render restrictor 220 can iteratively re-run the functionalities of the content element identification module 225, the domain-based detection module 230, the visual-based detection module 235, action-based detection module 240, and the content element restriction module 245, whenever detecting a process or transmission by the application 205.

Figure 4:
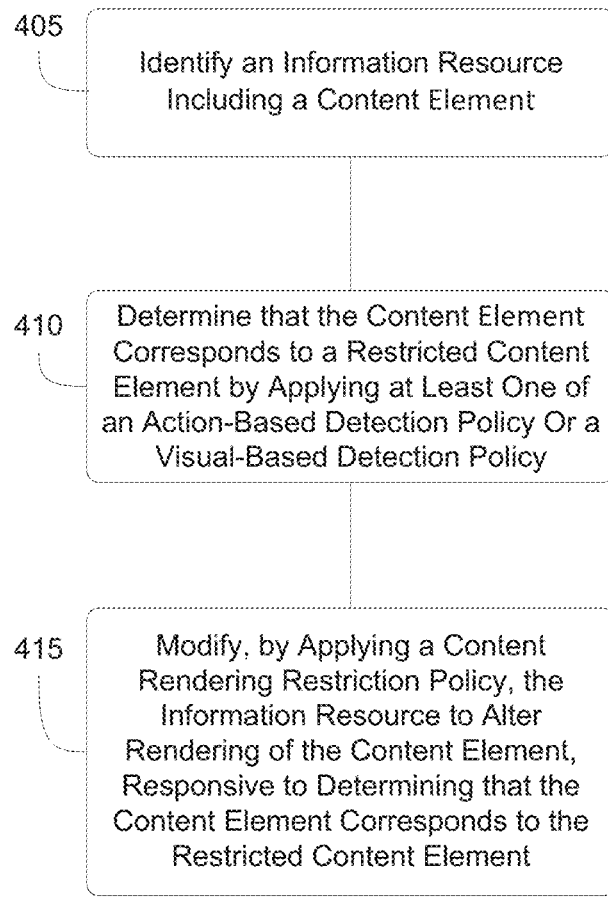
FIG. 4 is a flow diagram depicting a method of dynamically inserting content on an information resource, according to an illustrative implementation.
Figure 6:
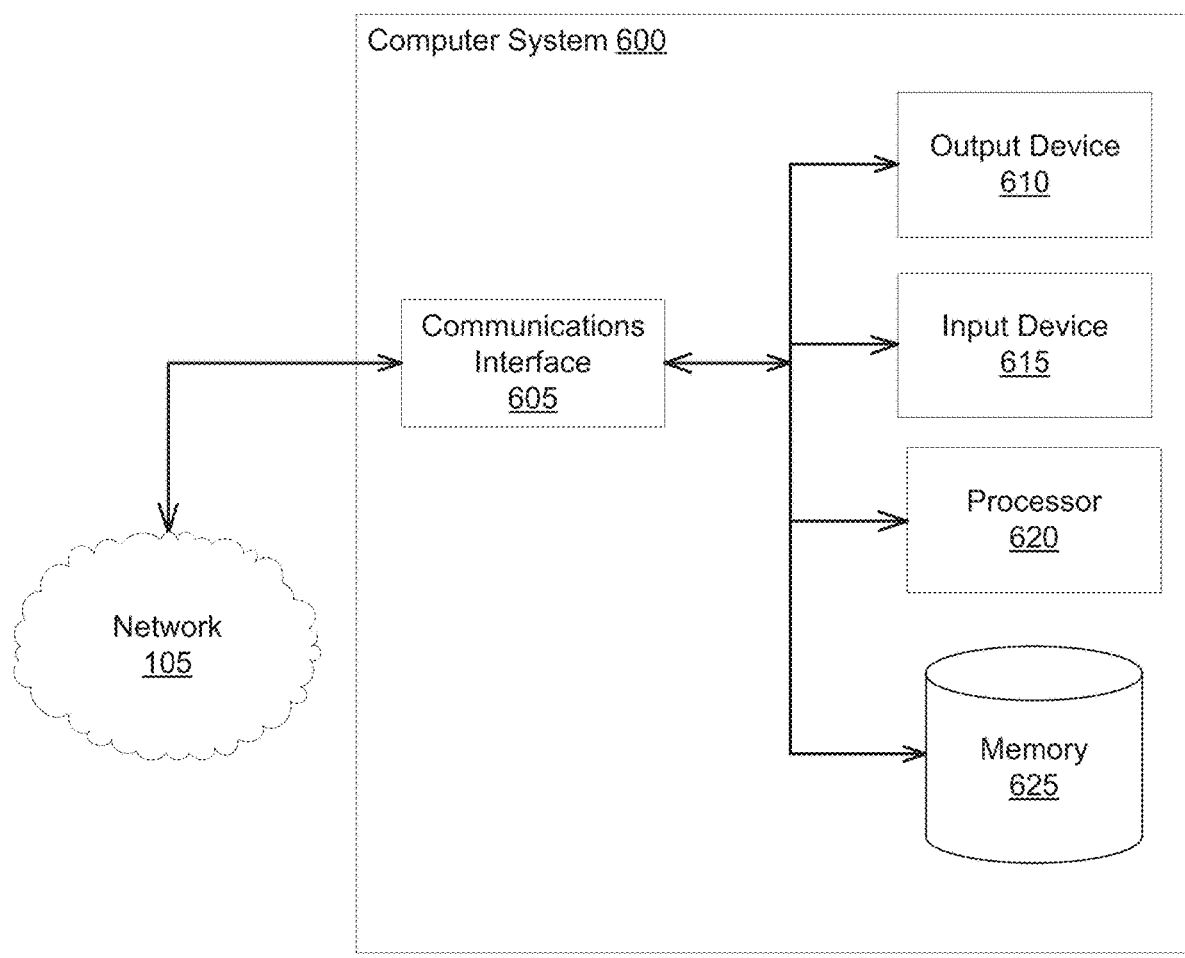
FIG. 6 is a block diagram illustrating a general architecture for a computer system that may be employed to implement elements of the systems and methods described and illustrated herein, according to an illustrative implementation.

Referring to FIG. 4, FIG. 4 is a flow diagram depicting a method 400 of attributing a scroll event on an application. The functionality described herein with respect to method 400 can be performed or otherwise executed by the data processing system 110, client device 125, or proxy device 150 as shown in FIG. 1, the content render restriction system as shown in FIG. 2, or a computing device as shown in FIG. 6, or any combination thereof. In brief overview, a computing device can identify an information resource including a content element (BLOCK 405). The computing device can determine that the content element corresponds to a restricted content element by applying at least one of an action-based detection policy or a visual-based detection policy (BLOCK 410). The computing device can modify, by applying a content rendering restriction policy, the information resource to alter rendering of the content element (BLOCK 415).

In further detail, the computing device can identify an information resource including a content element (BLOCK 405). The information resource and the one or more content elements (such as the first content element) of the information resource can be received via the network from an external server (e.g., the data processing system 110, the content publisher computing device 115, or the content provider computing device 120). In some implementations, the information resource and the one or more content elements can be from the same source (e.g., the data processing system 110). In some implementation, the same source may be identified by a similar identifier. For example, the information resource may correspond to the URL "www.example.com/index.html" whereas one of the content elements corresponds to "www.example.com/q31.html." In this example, the host names in the URL for the information resource and the content element is the same. In some implementations, the information resource and the one or more content elements can be from the different sources identified by different identifiers. For example, the information resource may correspond to the URL.

The information resource can include script, markup, or otherwise code processed by the application and executed by the one or more processors of the application. For example, the information resource can include HyperText Markup Language (HTML), Extensible HyperText Markup Language (XHTML), Extensible Markup Language (XML), Cascading Style Sheets (CSS), and JAVASCRIPT, or any combination thereof. The information resource can include one or more content elements, one or more corresponding style rules, and the content formatting script. Each of the one or more content elements can correspond to a segment of the code of the information resource. In some implementations, each of the content elements can include an HTML element. An HTML element can include, for example, a heading, body, paragraph, division, section, inline frame, image, canvas, applet, script, audio, video, table, and list, among others. Each of the content elements can include one or more formats. Each of the one or more formats of each of the content elements can include a corresponding attribute. Examples of attributes for content elements may include color, font, font size, font type, size, and position, among others. Each of the one more style rules (e.g., CSS style rules) can specify one or more visual properties of the characteristic of the corresponding format of the respective the content element. For example, the CSS style rule of the first format for the content element 215A can specify that any text of the first content element 215A is to be aligned to the center (e.g., "text-align: center"). In this example, the CSS style rule of the second format of the content element can specify that any text of the first content element is to be aligned to the right (e.g., "text-align: right"). The content formatting script can select one or more formats for the one or more content elements for processing and rendering by the one or more modules of the application.

The content formatting script can be executed by the application to dynamically change, modify, or update the formatting of each of the one or more content elements of the information resource. In some implementations, the application can change, modify, or update the one or more content elements of the information resource arbitrarily or randomly. The computing device can in turn change, modify, or remove the display or rendering of the one or more content elements based on a domain-based policy, visual-based policy, or an action-based policy, thereby causing an alteration in the behavior of the displayed information resource.

The computing device can identify the information resource and the one or more content elements included in the information resource. In some implementations, the computing device can identify one or more code segments corresponding to the one or more content elements included in the information resource. In some implementations, the computing device can parse the information resource to identify a content element type for each of the one or more content elements. For example, the computing device can identify that the information resource includes an inline frame content element based on the HTML tag "<iframe>." In some implementations, the computing device can parse the information resource can identify one or more function calls included in the information resource for any of the one or more content elements. For example, the computing device can search the script of the information resource for a string corresponding to a function call.

The application can process each of the one or more content elements of the information resource to generate a document tree. For example, the application can parse the HTML markup of the information resource to generate a Document Object Model (DOM) tree. The document tree can include one or more content objects associated with each other in a hierarchical manner. For example, two content objects in the DOM tree can have a parent-child relationship in a tree data structure. Each of the content objects can correspond to one format for one of the one or more content elements. Each of the content objects in the document tree can include one or more properties or attributes.

The computing device can identify or access the document tree generated by the application. In some implementations, the computing device can identify the one or more content objects of the document tree. The computing device can identify a content object type of each of the one or more content objects in the document tree. The computing device can determine, for each of the one or more content elements, a corresponding content object in the document tree. The computing device can identify one or more properties or attributes of each of the one or more content objects of the document tree.

The application can identify a subset of content objects of the document tree that is to be rendered and a subset of content objects of the document tree that is not to be rendered. The application can identify the link content object to import style rules (e.g., CSS style sheets) specified for the information resource. The application can remove the subset of content objects that is not to be rendered from the document tree. The application can match each of the content objects in subset of the content objects that is to be rendered with the style rule specified in the information resource to generate an object model.

The computing device can identify or access the object model generated by the application. In some implementations, the computing device can identify the one or more content objects of the object model. The computing device can identify a content object type of each of the one or more content objects in the object model. The computing device can determine, for each of the one or more content elements, a corresponding content object in the object model. The computing device can identify one or more properties or attributes of each of the one or more content objects of the object model.

The application can generate a rendering tree for rendering the information resource. The application can include a layout engine, rendering engine, or any module, engine, or process of the application to prepare rendering of the information resource on a display of the application. In some implementations, the application can generate the rendering tree based on the object model or the document tree. In some implementations, the application can generate one or more render properties for each of the content objects and the matched style rule in the object model. In some implementations, the application can generate the one or more properties based on the properties or attributes specified in the respective content object in the document tree or the matched style rule in the object model. The rendering tree can include one or more nodes associated with each other in a hierarchical manner. For example, two nodes can have a parent-child relationship in a tree data structure. Each of the nodes in the rendering tree can correspond to a content element of the information resource that is to be rendered. Each of the nodes in the render can be matched to one or more rendering properties.

The computing device can identify or access the rendering tree generated by the application. In some implementations, the computing device can identify the one or more nodes of the rendering tree. The computing device can identify a node type of each of the one or more nodes in the rendering tree. The computing device can determine, for each of the one or more content elements, a corresponding node in the rendering tree. The computing device can identify one or more properties or attributes of each of the one or more nodes of the rendering tree.

The application can process a layout based on the rendering tree. The layout can include one or more sub-layouts in a list, array, or tree data structure. Each of the one or more sub-layouts can correspond to a node on the rendering tree. Each of the one or more sub-layouts can include rendering information specifying how the node corresponding to one of the content elements is to be rendered on a display of the application. For example, a sub-layout may specify the absolute pixel positions a node is to occupy on the display. The application can traverse the nodes of the rendering tree. For each node traversed, the application can generate the corresponding sub-layout based on the one or more rendering properties for the node. The application can additionally process the layout generated by the application for displaying the information resource on the application.

The computing device can identify or access the layout generated by the application. In some implementations, the computing device can identify the one or more sub-layouts of the layout. The computing device can identify a sub-layout type of each of the one or more sub-layouts in the layout. For example, the computing device can identify that one of the sub-layouts corresponds to an image sub-layout. The computing device can determine, for each of the one or more content elements, a corresponding sub-layout in the layout. The computing device can identify one or more properties or attributes of each of the one or more sub-layouts of the layout.

The computing device can determine that the content element corresponds to a restricted content element by applying at least one of an action-based detection policy or a visual-based detection policy (BLOCK 410). In some implementations, using the one or more content elements identified by the computing device, the computing device can determine whether any of the one or more content elements is a restricted content element based on a domain-based detection policy. The domain-based detection policy may be maintained in the database of the computing device. In some implementations, by applying the domain-based detection policy, the computing device can identify a host address one of the one or more content elements and a host address of the information resource. The computing device can determine whether the host address of the identified content element differs from the host address of the information resource. If the host addresses differ, the computing device can determine that the respective content element is a restricted content element. In some implementations, by applying the domain-based detection policy, the computing device can identify that one of one or more content elements includes a link. The computing device can determine that the link of the respective content element includes an address different from the host address of the information resource.

Using the one or more content elements identified by the content element identification module, the computing device can determine whether any of the one or more content elements is a restricted content element based on a visual-based detection policy. The visual-based detection policy may be maintained by the database of the computing device. The computing device can determine whether any of the one or more content elements includes one or more restricted properties or attributes specified by the visual-based detection policy.

In some implementations, the computing device can identify a dimension or a position of each of the content elements from the one or more graphical properties or attributes of each of the content elements of the information resource. In some implementations, the computing device can determine that the dimension or the position of each of the content elements of the information resource matches one or more predesignated dimensions or one or more predesignated positions. The predesignated dimensions or predesignated positions may correspond to or be associated with content elements identified as restricted content elements. For example, pre-designated dimensions may be those of online ads, such as 468×60 pixels (full banner ads), 160×600 pixels (wide skyscraper banner ads), and 720×300 (pop-under ads), among others. Examples of pre-designated positions may include top alignments, left alignments, right alignments, and bottom alignments, among others.

In some implementations, the computing device can identify a color value (e.g., RGB value, alphanumerical identifier, or HTML color code) of each of the one or more content elements from the graphical properties or attributes of the respective content element. In some implementations, the computing device can identify a color value of the information resource. The computing device can calculate a difference in color value between one and one or more other content elements. If the difference in color value between one of the content elements versus the remaining content elements is above a predetermined threshold, the computing device can determine that the one content element is a restricted content element. The computing device can calculate a difference in color value between one of the content elements and the information resource. If the difference in color value between the content element and the information resource is above a predetermined threshold, the computing device can determine that the respective content element is a restricted content element.

In some implementations, the computing device can identify one or more characters from each of the one or more content elements. The one or more characters may be from a text field or a metadata field of the respective content element. In some implementations, the computing device can determine whether the one or more characters identified from each of the one or more content elements matches or is similar to one or more predesignated characters identified in restricted content elements. The one or more predesignated characters may be from the restricted format policy. In some implementations, the computing device can determine or calculate a semantic similarity measure between the one or more characters identified from each of the one or more content elements and the one or more predesignated characters. For example, the computing device can apply an approximate string match algorithm to calculate the similarity measure. In some implementations, the computing device can compare the semantic similarity measure to a threshold measure. In some implementations, the computing device can identify the respective content element having the one or more characters as a restricted content element, responsive to determining that the semantic similarity measure is greater than the threshold measure.

In some implementations, the computing device can identify one or more image content elements of the information resource based on the content element type identified by the computing device. The computing device can apply image recognition algorithms to determine whether the one or more image content elements include a restricted visual element. Examples of image recognition algorithms include optical character recognition, object recognition, edge detection, feature detection (e.g., affiant feature detection), image matching algorithms, and image pattern recognition algorithms, among others. In some implementations, the computing device can identify one or more character strings from the image content element by applying an optical character recognition algorithm. The computing device can determine that at least one of the one more character strings matches one more predesignated character strings. The predesignated character strings can be maintained by the database of the computing device and can correspond to or be associated with character strings identified in restricted content elements. Examples of predesignated characters include "click here," "purchase," "sale," "xxx," and "$," among others. In some implementations, the computing device can identify one or more visual features from the image content element by applying feature detection or object recognition algorithms. In some implementations, the computing device can determine that at least one of the one or more visual features matches one or more predesignated visual features. The predesignated visual features can be maintained by the database of the computing device and can correspond to or be associated with one or more visual features identified in restricted content elements. Examples of predesignated visual features can include user interface elements such as an exit button, minimize, or maximize button, among others.

Using the one or more content elements identified by the computing device, the computing device can determine whether any of the one or more content elements is a restricted content element based on an action-based detection policy. The action-based policy may be maintained by the database of the computing device. The action-based policy may include a list of events, actions, and transmissions, among others used to determine restricted content elements. The computing device can identify the function call from the information resource parsed by the computing device. In some implementations, by applying the action-based detection policy, the computing device can identify whether any of the one or more content elements includes a function call that is restricted. The computing device can determine that the function call is restricted by searching the action-based detection policy for a list of restricted function calls. Examples of restricted function calls include changes in graphical properties or attributes of the content element, such as dimension, position, color, and font, among others. In some implementations, by applying the action-based detection policy, the computing device can determine that one of the one or more content elements is a restricted content element. The restricted content element may be a pre-designated restricted type of content element. For example, the action-based detection policy may indicate that applet, audio, or visual content elements are not to be rendered by the application.

With the identified document tree, the computing device can determine whether any of the content objects of the document tree is a restricted content object. The computing device can apply a domain-based detection policy. The domain-based detection policy may be maintained by the database of the computing device. In some implementations, the computing device can traverse the document tree. While traversing the document tree, applying the domain-based detection policy, the computing device can determine whether any of the one or more content objects is a restricted content object. In some implementations, applying the domain-based detection policy, the computing device can determine whether any of the one or more content objects includes one or more restricted properties or attributes. In some implementations, applying the domain-based detection policy, the computing device can determine whether any of the one or more content objects originates from a host different from the information resource based on a host name for the content object and the host name for the information resource. In some implementations, applying the domain-based detection policy, the computing device can determine whether any of the one or more content objects includes a link including a host name different from the host name of the information resource. For example, the computing device can identify that the content object include a link including a host name different from the information resource. Based on the difference in host names, the computing device can determine that the content object is a restricted content object.

With the identified document tree, the computing device can determine whether any of the content objects of the document tree is a restricted content object. The computing device can apply a visual-based detection policy. The visual-based detection policy may be maintained by the database of the computing device. In some implementations, the computing device can traverse the document tree. While traversing the document tree, applying the visual-based detection policy, the computing device can determine whether any of the one or more content objects is a restricted content object.

In some implementations, applying the visual-based detection policy, the computing device can determine whether any of the one or more content objects includes one or more restricted properties or attributes specified by the visual-based detection policy. In some implementations, the computing device can identify a dimension or a position of the content element from the one or more graphical properties or attributes of each of the content objects of the document tree. In some implementations, the computing device can determine that the dimension or the position of each of the content object of the document tree matches one or more predesignated dimensions or one or more predesignated positions. The predesignated dimensions or predesignated positions may correspond to or be associated with content elements identified as restricted content elements. For example, pre-designated dimensions may be those of online ads, such as 468×60 pixels (full banner ads), 160×600 pixels (wide skyscraper banner ads), and 720×300 (pop-under ads), among others. Examples of pre-designated positions may include top alignments, left alignments, right alignments, and bottom alignments, among others.

In some implementations, applying the visual-based detection policy, the computing device can identify a color value (e.g., RGB value, alphanumerical identifier, or HTML, color code) of each of the one or more content objects from the graphical properties or attributes of the respective content object of the document tree. In some implementations, the computing device can identify a color value of the information resource or from the document content object of document tree. The computing device can calculate a difference in color value between one and one or more other content objects of the document tree. If the difference in color value between one of the content objects versus the remaining content objects is above a predetermined threshold, the computing device can determine that the one content objects is a restricted content object. The computing device can calculate a difference in color value between one of the content objects and the information resource. If the difference in color value between the content object and the information resource is above a predetermined threshold, the computing device can determine that the respective content objects is a restricted content object.

In some implementations, the computing device can identify one or more characters from each of the one or more content objects of the document tree. The one or more characters may be from a text field or a metadata field of the respective content object. In some implementations, the computing device can determine whether the one or more characters identified from each of the one or more content object matches or is similar to one or more predesignated characters identified in restricted content elements. The one or more predesignated characters may be from the restricted format policy. In some implementations, the computing device can determine or calculate a semantic similarity measure between the one or more characters identified from each of the one or more content objects and the one or more predesignated characters. For example, the computing device can apply an approximate string match algorithm to calculate the similarity measure. In some implementations, the computing device can compare the semantic similarity measure to a threshold measure. In some implementations, the computing device can identify the respective content object having the one or more characters as a restricted content element, responsive to determining that the semantic similarity measure is greater than the threshold measure.

In some implementations, the computing device can identify one or more image content objects of the document tree based on the content object type identified by the computing device. The computing device can access or retrieve images associated with the one or more image content objects of the document tree. The computing device can apply image recognition algorithms to determine whether an image included in one or more image content objects includes a restricted visual element. Examples of image recognition algorithms include optical character recognition, object recognition, edge detection, feature detection (e.g., affiant feature detection), image matching algorithms, and image pattern recognition algorithms, among others. In some implementations, the computing device can identify one or more character strings from the image content object by applying an optical character recognition algorithm. The computing device can determine that at least one of the one more character strings matches one more predesignated character strings. The predesignated character strings can be maintained by the database of the computing device and can correspond to or be associated with character strings identified in restricted content elements. Examples of predesignated characters include "click here," "purchase," "sale," "xxx," and "$," among others. In some implementations, the computing device can identify one or more visual features from the image content object by applying feature detection or object recognition algorithms. In some implementations, the computing device can determine that at least one of the one or more visual features matches one or more predesignated visual features. The predesignated visual features can be maintained by the database of the computing device and can correspond to or be associated with one or more visual features identified in restricted content elements. Examples of predesignated visual features can include user interface elements such as an exit button, minimize, or maximize button, among others.

With the identified document tree, the computing device can determine whether any of the content objects of the document tree is a restricted content object. The computing device can apply an action-based detection policy. The action-based detection policy may be maintained by the database of the computing device. In some implementations, the computing device can traverse the document tree. While traversing the document tree, applying the action detection policy, the computing device can determine whether any of the one or more content objects is a restricted content object. In some implementations, by applying the action-based detection policy, the computing device can determine that one of the one or more content objects of the document tree is a restricted content element. The restricted content element may be a pre-designated restricted type of content element. For example, the action-based detection policy may indicate that applet, audio, or visual content elements are not to be rendered by the application.

With the identified object model, the computing device can determine whether any of the content objects of the object model is a restricted content object. The computing device can apply a domain-based detection policy. The domain-based detection policy may be maintained by the database of the computing device. In some implementations, the computing device can traverse the object model. While traversing the object model, applying the domain-based detection policy, the computing device can determine whether any of the one or more content objects is a restricted content object. In some implementations, applying the domain-based detection policy, the computing device can determine whether any of the one or more content objects includes one or more restricted properties or attributes. In some implementations, applying the domain-based detection policy, the computing device can determine whether any of the one or more content objects originates from a host different from the information resource based on a host name for the content object and the host name for the information resource. In some implementations, applying the domain-based detection policy, the computing device can determine whether any of the one or more content objects includes a link including a host name different from the host name of the information resource.

With the identified object model, the computing device can determine whether any of the content objects of the object model is a restricted content object. The computing device can apply a visual-based detection policy. The visual-based detection policy may be maintained by the database of the computing device. In some implementations, the computing device can traverse the object model. While traversing the object model, applying the visual-based detection policy, the computing device can determine whether any of the one or more content objects is a restricted content object based on the corresponding style rule in the object model.

In some implementations, applying the visual-based detection policy, the computing device can determine whether any of style rules matched to the one or more content objects includes one or more restricted properties or attributes specified by the visual-based detection policy. In some implementations, the computing device can identify a dimension or a position of the content element from the one or more graphical properties or attributes of the style rules matched to each of the content objects of the object model. In some implementations, the computing device can determine that the dimension or the position of each of the content object of the object model matches one or more predesignated dimensions or one or more predesignated positions. The predesignated dimensions or predesignated positions may correspond to or be associated with content elements identified as restricted content elements. For example, pre-designated dimensions may be those of online ads, such as 468×60 pixels (full banner ads), 160×600 pixels (wide skyscraper banner ads), and 720×300 (pop-under ads), among others. Examples of pre-designated positions may include top alignments, left alignments, right alignments, and bottom alignments, among others.

In some implementations, applying the visual-based detection policy, the computing device can identify a color value (e.g., RGB value, alphanumeric designator, or HTML color value) of each of the one or more content objects from the graphical properties or attributes of the style rules matched to the respective content object of the object model. In some implementations, the computing device can identify a color value of the information resource or from the body content object of object model. The computing device can calculate a difference in color value between one and one or more other content objects of the object model. If the difference in color value between one of the content objects versus the remaining content objects is above a predetermined threshold, the computing device can determine that the one content objects is a restricted content object. The computing device can calculate a difference in color value between one of the content objects and the information resource. If the difference in color value between the content object and the information resource is above a predetermined threshold, the computing device can determine that the respective content objects is a restricted content object.

In some implementations, the computing device can identify one or more image content objects of the object model based on the content object type identified by the computing device. The computing device can access or retrieve images associated with the one or more image content objects of the object model. The computing device can apply image recognition algorithms to determine whether an image included in one or more image content objects includes a restricted visual element. Examples of image recognition algorithms include optical character recognition, object recognition, edge detection, feature detection (e.g., affiant feature detection), image matching algorithms, and image pattern recognition algorithms, among others. In some implementations, the computing device can identify one or more character strings from the image content object by applying an optical character recognition algorithm. The computing device can determine that at least one of the one more character strings matches one more predesignated character strings. The predesignated character strings can be maintained by the database of the computing device and can correspond to or be associated with character strings identified in restricted content elements. Examples of predesignated characters include "click here," "purchase," "sale," "xxx," and "$," among others. In some implementations, the computing device can identify one or more visual features from the image content object by applying feature detection or object recognition algorithms. In some implementations, the computing device can determine that at least one of the one or more visual features matches one or more predesignated visual features. The predesignated visual features can be maintained by the database of the computing device and can correspond to or be associated with one or more visual features identified in restricted content elements. Examples of predesignated visual features can include user interface elements such as an exit button, minimize, or maximize button, among others.

With the identified object model, the computing device can determine whether any of the content objects of the object model is a restricted content object. The computing device can apply an action-based detection policy. The action-based detection policy may be maintained by the database of the computing device. In some implementations, the computing device can traverse the object model. While traversing the object model, applying the action detection policy, the computing device can determine whether any of the one or more content objects is a restricted content object. In some implementations, by applying the action-based detection policy, the computing device can determine that one of the one or more content objects of the object model is a restricted content element. The restricted content element may be a pre-designated restricted type of content element. For example, the action-based detection policy may indicate that applet, audio, or visual content elements are not to be rendered by the application.

With the identified rendering tree, the computing device can determine whether any of the nodes of the rendering tree is a restricted node. The computing device can apply a visual-based detection policy. The visual-based detection policy may be maintained by the database of the computing device. In some implementations, the computing device can traverse the rendering tree. While traversing the rendering tree, applying the visual-based detection policy, the computing device can determine whether any of the one or more nodes is a restricted node. The computing device can identify the one or more rendering properties for each of the nodes in the rendering tree.

In some implementations, applying the visual-based detection policy, the computing device can determine whether any of the one or more rendering properties corresponding to each of the one or more nodes includes one or more restricted properties or attributes specified by the visual-based detection policy. In some implementations, the computing device can identify a dimension or a position of the content element from the one or more graphical properties or attributes of the one or more rendering properties for each of the nodes of the rendering tree. In some implementations, the computing device can determine that the dimension or the position of each of the node of the rendering tree matches one or more predesignated dimensions or one or more predesignated positions. The predesignated dimensions or predesignated positions may correspond to or be associated with content elements identified as restricted content elements. For example, pre-designated dimensions may be those of online ads, such as 468×60 pixels (full banner ads), 160×600 pixels (wide skyscraper banner ads), and 720×300 (pop-under ads), among others. Examples of pre-designated positions may include top alignments, left alignments, right alignments, and bottom alignments, among others.

In some implementations, applying the visual-based detection policy, the computing device can identify a color value (e.g., RGB value, alphanumerical identifier, or HTML color code) from the one or more rendering properties for each of the one or more nodes from the graphical properties or attributes of the one or more rendering properties for the respective node of the rendering tree. In some implementations, the computing device can identify a color value of the information resource or from the body node 325' of rendering tree. The computing device can calculate a difference in color value between one and one or more other nodes of the rendering tree. If the difference in color value between one of the nodes versus the remaining nodes is above a predetermined threshold, the computing device can determine that the one nodes is a restricted node. The computing device can calculate a difference in color value between one of the nodes and the information resource. If the difference in color value between the node and the information resource is above a predetermined threshold, the computing device can determine that the respective nodes is a restricted node.

In some implementations, the computing device can identify one or more image nodes of the rendering tree based on the node type identified by the computing device. The computing device can access or retrieve images associated with the one or more image nodes of the rendering tree. The computing device can apply image recognition algorithms to determine whether an image included in one or more image nodes includes a restricted visual element. Examples of image recognition algorithms include optical character recognition, object recognition, edge detection, feature detection (e.g., affiant feature detection), image matching algorithms, and image pattern recognition algorithms, among others. In some implementations, the computing device can identify one or more character strings from the image node by applying an optical character recognition algorithm. The computing device can determine that at least one of the one more character strings matches one more predesignated character strings. The predesignated character strings can be maintained by the database of the computing device and can correspond to or be associated with character strings identified in restricted content elements. Examples of predesignated characters include "click here," "purchase," "sale," "xxx," and "$," among others. In some implementations, the computing device can identify one or more visual features from the image node by applying feature detection or object recognition algorithms. In some implementations, the computing device can determine that at least one of the one or more visual features matches one or more predesignated visual features. The predesignated visual features can be maintained by the database of the computing device and can correspond to or be associated with one or more visual features identified in restricted content elements. Examples of predesignated visual features can include user interface elements such as an exit button, minimize, or maximize button, among others.

With the identified rendering tree, the computing device can determine whether any of the nodes of the rendering tree is a restricted node. The computing device can apply an action-based detection policy. The action-based detection policy may be maintained by the database of the computing device. In some implementations, the computing device can traverse the rendering tree. While traversing the rendering tree, applying the action detection policy, the computing device can determine whether any of the one or more nodes is a restricted node. In some implementations, by applying the action-based detection policy, the computing device can determine that one of the one or more nodes of the rendering tree is a restricted content element. The restricted content element may be a pre-designated restricted type of content element. For example, the action-based detection policy may indicate that applet, audio, or visual content elements are not to be rendered by the application.

With the identified layout, the computing device can determine whether any of the sub-layouts of the layout is a restricted sub-layout. The computing device can apply a visual-based detection policy. The visual-based detection policy may be maintained by the database of the computing device. In some implementations, the computing device can traverse the layout. While traversing the layout, applying the visual-based detection policy, the computing device can determine whether any of the one or more sub-layouts is a restricted sub-layout. The computing device can identify the one or more rendering properties for each of the sub-layouts in the layout.

In some implementations, applying the visual-based detection policy, the computing device can determine whether any of the one or more rendering properties corresponding to each of the one or more sub-layouts includes one or more restricted properties or attributes specified by the visual-based detection policy. In some implementations, the computing device can identify a dimension or a position of the content element from the one or more graphical properties or attributes of the one or more rendering properties for each of the sub-layouts of the layout. In some implementations, the computing device can determine that the dimension or the position of each of the sub-layout of the layout matches one or more predesignated dimensions or one or more predesignated positions. The predesignated dimensions or predesignated positions may correspond to or be associated with content elements identified as restricted content elements. For example, pre-designated dimensions may be those of online ads, such as 468×60 pixels (full banner ads), 160×600 pixels (wide skyscraper banner ads), and 720×300 (pop-under ads), among others. Examples of pre-designated positions may include top alignments, left alignments, right alignments, and bottom alignments, among others.

In some implementations, applying the visual-based detection policy, the computing device can identify a color value (e.g., RGB value, alphanumerical identifier, or HTML, color code) from the one or more rendering properties for each of the one or more sub-layouts from the graphical properties or attributes of the one or more rendering properties for the respective sub-layout of the layout. In some implementations, the computing device can identify a color value of the information resource or from the body sub-layout 325' of layout. The computing device can calculate a difference in color value between one and one or more other sub-layouts of the layout. If the difference in color value between one of the sub-layouts versus the remaining sub-layouts is above a predetermined threshold, the computing device can determine that the one sub-layouts is a restricted sub-layout. The computing device can calculate a difference in color value between one of the sub-layouts and the information resource. If the difference in color value between the sub-layout and the information resource is above a predetermined threshold, the computing device can determine that the respective sub-layouts is a restricted sub-layout.

In some implementations, the computing device can identify one or more image sub-layouts of the layout based on the sub-layout type identified by the computing device. The computing device can access or retrieve images associated with the one or more image sub-layouts of the layout. The computing device can apply image recognition algorithms to determine whether an image included in one or more image sub-layouts includes a restricted visual element. Examples of image recognition algorithms include optical character recognition, object recognition, edge detection, feature detection (e.g., affiant feature detection), image matching algorithms, and image pattern recognition algorithms, among others. In some implementations, the computing device can identify one or more character strings from the image sub-layout by applying an optical character recognition algorithm. The computing device can determine that at least one of the one more character strings matches one more predesignated character strings. The predesignated character strings can be maintained by the database of the computing device and can correspond to or be associated with character strings identified in restricted content elements. Examples of predesignated characters include "click here," "purchase," "sale," "xxx," and "$," among others. In some implementations, the computing device can identify one or more visual features from the image sub-layout by applying feature detection or object recognition algorithms. In some implementations, the computing device can determine that at least one of the one or more visual features matches one or more predesignated visual features. The predesignated visual features can be maintained by the database of the computing device and can correspond to or be associated with one or more visual features identified in restricted content elements. Examples of predesignated visual features can include user interface elements such as an exit button, minimize, or maximize button, among others.

With the identified layout, the computing device can determine whether any of the sub-layouts of the layout is a restricted sub-layout. The computing device can apply an action-based detection policy. The action-based detection policy may be maintained by the database of the computing device. In some implementations, the computing device can traverse the layout. While traversing the layout, applying the action detection policy, the computing device can determine whether any of the one or more sub-layouts is a restricted sub-layout. In some implementations, by applying the action-based detection policy, the computing device can determine that one of the one or more sub-layouts of the layout is a restricted content element. The restricted content element may be a pre-designated restricted type of content element. For example, the action-based detection policy may indicate that applet, audio, or visual content elements are not to be rendered by the application.

The application can process the altered document tree, object model, rendering tree, or layout. In some implementations, subsequent to the computing device changing, modifying, or removing any of the content objects in the document tree, the content objects or the matched style rules in the object model, nodes of the rendering tree, or sub-layouts of the layout, the application can process the document tree, object model, rendering tree, or layout and render the information resource for display on the application.

Subsequent to the application displaying the information resource, the computing device can monitor for one or more processes of the application. In some implementations, the computing device can detect one or more function calls by the application while processing the information resource. In some implementations, the computing device may cause changes to any of the one or more content elements of the information resource, one or more content objects of the document tree, one or more content objects or a matched style rule of the one or more content objects of the object model, one or more nodes of the rendering tree, or the sub-layouts of the layout, thereby resulting in one or more function calls in the application. For example, the computing device may modify the one or more content elements from one format to another format by setting a different size, position, or color, among other visual characteristics.

In some implementations, the computing device can identify a change in the one or more graphical attributes or properties of the one or more content elements of the information resource, one or more content objects of the document tree, one or more content objects or a matched style rule of the one or more content objects of the object model, one or more nodes of the rendering tree, or the sub-layouts of the layout. In some implementations, the computing device can detect a regenerate command for the information resource. The regenerate command may be indicative of one or more changes or alterations in the rendering of the information resource by the application. In some implementations, the regenerate command may be generated by the application of the application responsive to an insertion or addition of a new content element to the information resource, an insertion or addition of a new content object to the document tree, an insertion or addition of a new content object or a change or modification in a style rule in the object model, an insertion or addition of a new node or a change or modification in one or more rendering properties in the rendering tree, or insertion or addition of a new sub-layout or a change or modification in one or more sub-layouts in the layout.

Responsive to detecting one or more processes of the application, the computing device can identify the one or more content elements corresponding to or associated with the respective process. For example, the computing device can detect function calls made by an event listener and identify a button content element on the information resource based on the detected function calls. In some implementations, the computing device can identify the one or more content elements corresponding to or associated with the change in the one or more graphical attributes or properties of the one or more content elements of the information resource, one or more content objects of the document tree, one or more content objects or a matched style rule of the one or more content objects of the object model, one or more nodes of the rendering tree, or the sub-layouts of the layout. In some implementations, the computing device can identify the one or more content elements, content objects of the document tree, style rules of the object model, nodes in the rendering tree, and sub-layouts in the layout corresponding to or associated with the regenerate command.

In some implementations, the computing device can monitor for one or more transmissions from the application. The one or more transmissions can include a pingback generated from the instructions for one or more of the content elements. In some implementations, the computing device can detect a request from the one or more transmissions from the application. The request can include a request for another information resource or a request for additional content elements, among others. In some implementations, the computing device can identify the one or more content elements corresponding to or associated with the transmission of the pingback or request.

The computing device can modify, by applying a content rendering restriction policy, the information resource to alter rendering of the content element, responsive to determining that the content element corresponds to the restricted content element (BLOCK 415). In some implementations, responsive to determining that any one of the content elements is a restricted content element, the computing device can apply a content rendering restriction policy. The content rendering restriction policy may be maintained by the database of the computing device. The computing device can change, modify, or remove the respective content element. In some implementations, the computing device can alter a portion of the script of the information resource corresponding to the restricted content element. In some implementations, the computing device can add an additional content element to the information resource as an overlay to occlude or otherwise restrict visibility of the respective content element.

Responsive to determining that any one of the content objects is a restricted content object, the computing device can apply a content rendering restriction policy. In some implementations, the computing device can change, modify, or remove the respective content object in the document tree. In some implementations, the computing device can change, modify, or remove the content object in the document tree. In some implementations, the computing device can add an additional content object to the document tree as an overlay to occlude or otherwise restrict visibility of the respective content object when displayed by the application.

Responsive to determining that any one of the content objects is a restricted content object, the computing device can apply the content rendering restriction policy. The computing device can change, modify, or remove the respective content object or the style rule matched to the content object in the object model. In some implementations, the computing device can change, modify, or remove the content object or the style rule matched to the content object in the object model. In some implementations, the computing device can set a display property of a style rule matched to one of the content objects in the object model to null. In some implementations, the computing device can add an additional content object with a corresponding matched style rule to the object model as an overlay to occlude or otherwise restrict visibility of the respective content object when displayed by the application.

Responsive to determining that any one of the nodes is a restricted node, the computing device can apply the content rendering restriction policy. The computing device can change, modify, or remove the respective node or the respective one or more rendering properties in the rendering tree. In some implementations, the computing device can change, modify, or remove the node or the respective one or more rendering properties in the rendering tree. For example, the computing device can set a delete a node or a corresponding parent node from the rendering tree. In some implementations, the computing device can add an additional node to the rendering tree as an overlay to occlude or otherwise restrict visibility of the respective node when displayed by the application.

Responsive to determining that any one of the sub-layouts is a restricted sub-layout, the computing device can apply the content rendering restriction policy. The computing device can change, modify, or remove the respective sub-layout or the respective one or more rendering properties in the layout. In some implementations, the computing device can change, modify, or remove the sub-layout or the respective one or more rendering properties in the layout. In some implementations, the computing device can add an additional sub-layout to the layout as an overlay to occlude or otherwise restrict visibility of the respective sub-layout when displayed by the application.

In some implementations, responsive to identifying the one or more content elements, content objects of the document tree, style rules of the object model, nodes in the rendering tree, and sub-layouts in the layout, by applying the action-based detection policy, the computing device can determine whether the associated process is a restricted process. The action-based detection policy may list one or more processes that may be restricted. Examples of restricted processes include change in size, change in position, and change in color, among others. If the process is not a restricted process, the computing device can allow or permit the process to continue. In some implementations, the application of the application can update the information resource with the process executed and display the newly updated information resource. If the process is a restricted process, the computing device can terminate the process. In some implementations, the computing device can interface with the computing device or the computing device to determine whether the process is permitted by repeating previously described functionalities.

Responsive to determining that the process is not permitted, the computing device can modify, change, or remove the respective content elements. In some implementations, responsive to determining that the process is not permitted, the computing device can modify, change, or remove the identified one or more content objects of the document tree, one or more content objects or a matched style rule of the one or more content objects of the object model, one or more nodes of the rendering tree, or the sub-layouts of the layout. For example, if a change in size is detected for one of the nodes of the rendering tree, the computing device can identify the previous size from the previous rendering properties for the respective node. In this example, the computing device can set the size to the previous size.

In some implementations, the computing device can change, modify, or otherwise remove the one or more content elements corresponding to or associated with the transmission of the pingback or request. For example, the pingback or request may include an identifier of the respective content element. Using the identifier, the computing device can identify the respective content element.

Figure 5:
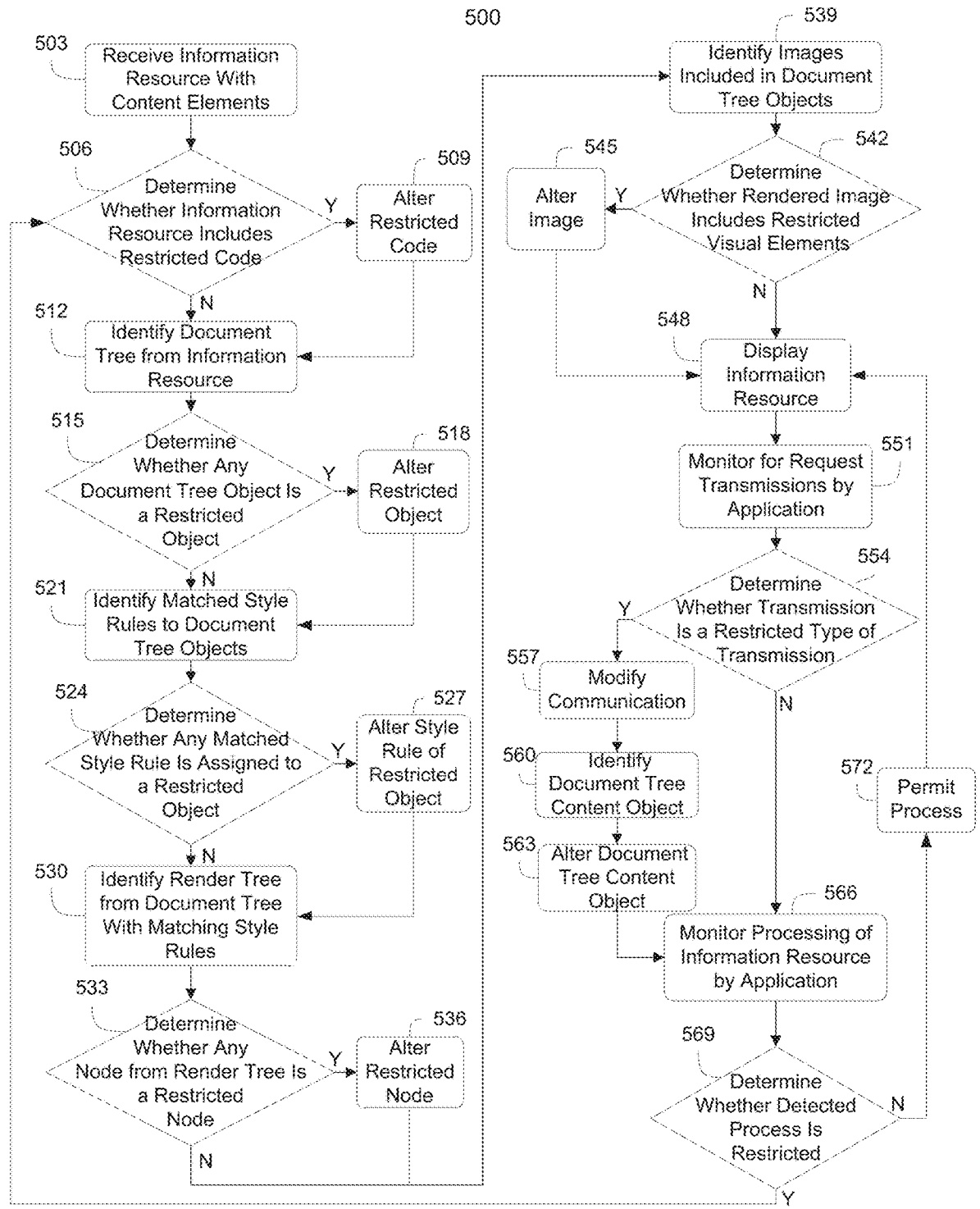
FIG. 5 is a flow diagram depicting a method of dynamically inserting content on an information resource, according to an illustrative implementation.

FIG. 5 is a flow diagram depicting a method 500 of deploying countermeasures against unauthorized scripts interfering with the rendering of content elements on information resources, according to an illustrative implementation. The functionality described herein with respect to method 400 can be performed or otherwise executed by the data processing system 110 or client device 125 as shown in FIG. 1, the content render verification system 200A as shown in FIG. 2A, or a computing device as shown in FIG. 7, or any combination thereof. In brief overview, the computing device can receive an information resource including content elements (BLOCK 503). The computing device can determine whether the information resource includes restricted code (BLOCK 506). If the information resource includes restricted code, the computing device can alter the restricted code (BLOCK 509). The computing device can identify a document tree generated by an application of the device based on the information resource (BLOCK 512). The computing device can determine whether any content object of the document tree is a restricted content object (BLOCK 515). If any content object of the document tree is determined to be a restricted content object, the computing device can alter the restricted content object (BLOCK 518). The computing device can identify an object model matching style rules to the document tree content objects (BLOCK 521). The computing device can determine whether any matched style rule is assigned to a restricted content object (BLOCK 524). If any matched style rule is assigned to a restricted content object, the computing device can alter the style rule of the restricted content object (BLOCK 527). The computing device can identify a rendering tree generated by the application from the object model (BLOCK 530). The computing device can determine whether any node in the rendering tree is a restricted node (BLOCK 533). If any node in the rendering tree is a restricted node, the computing device can alter the restricted node (BLOCK 536). The computing device can identify images associated with the content elements of the information resource (BLOCK 539). The computing device can determine whether the rendered image includes restricted visual elements (BLOCK 542). If the rendered imaged includes restricted visual elements, the computing device can alter the image (BLOCK 545).

The computing device can subsequently display the information resource (BLOCK 548). The computing device can monitor transmissions for request of content by the application (BLOCK 551). The computing device can determine whether the transmission is a restricted type of transmission (BLOCK 554). If the transmission is a restricted type of transmission, the computing device can modify communications (BLOCK 557), identify the document tree content object associated with the transmission (BLOCK 560), and alter the document tree content object identified (BLOCK 563). The computing device can monitor processing of the information resource by the application (BLOCK 566). The computing device can determine whether a detected process is a restricted process (BLOCK 569). If the detected process is not a restricted process, the computing device can permit the process (BLOCK 572) and update the display of the information resource (BLOCK 548). If the detected process is a restricted process, the computing device can repeat the method 500 from BLOCK 506.

FIG. 6 shows the general architecture of an illustrative computer system 600 that may be employed to implement any of the computer systems discussed herein (including the system 110 and its components such as the content request module 130, the content selection module 135, and script provider module 140 or the application 205 and its modules, the document tree generator 206, the rendering tree generator 208, the display module 210, and content formatting script 214, or the application render restrictor 220 and its components, the content element identification module 225, domain based detection module 230, visual based detection module 235, action based detection module 240, and content render restriction module 245) in accordance with some implementations. The computer system 600 can be used to provide information via the network 105 for display. The computer system 600 of FIG. 6 comprises one or more processors 620 communicatively coupled to memory 625, one or more communications interfaces 605, and one or more output devices 610 (e.g., one or more display units) and one or more input devices 515. The processors 620 can be included in the data processing system 110 or the other components of the system 110 such as the content request module 130, the content selection module 135, and the script provider module 140. The processors can be included in the client device 125 or the proxy device 150 or their modules, such as the application 205, the document tree generator 206, the rendering tree generator 208, the display module 210, content formatting script 214, the application render restrictor 220, the content element identification module 225, domain based detection module 230, visual based detection module 235, action based detection module 240, and content render restriction module 245.

In the computer system 600 of FIG. 6, the memory 625 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 110 of FIG. 1, the data processing system 110 can include the memory 625 to store information related to the availability of inventory of one or more content units, reservations of one or more content units, among others. The memory 625 can include the database 145. The processor(s) 620 shown in FIG. 6 may be used to execute instructions stored in the memory 625 and, in so doing, also may read from or write to the memory various information processed and or generated pursuant to execution of the instructions.

The processor 620 of the computer system 600 shown in FIG. 6 also may be communicatively coupled to or control the communications interface(s) 605 to transmit or receive various information pursuant to execution of instructions. For example, the communications interface(s) 605 may be coupled to a wired or wireless network, bus, or other communication means and may therefore allow the computer system 600 to transmit information to or receive information from other devices (e.g., other computer systems). While not shown explicitly in the system of FIG. 1, one or more communications interfaces facilitate information flow between the components of the system 600. In some implementations, the communications interface(s) may be configured (e.g., via various hardware components or software components) to provide a website as an access portal to at least some aspects of the computer system 600. Examples of communications interfaces 605 include user interfaces (e.g., web pages), through which the user can communicate with the data processing system 600.

The output devices 610 of the computer system 600 shown in FIG. 6 may be provided, for example, to allow various information to be viewed or otherwise perceived in connection with execution of the instructions. The input device(s) 515 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The content request module 130, the content selection module 135, and the script provider module 140 can include or share one or more data processing apparatuses, computing devices, or processors. The application 205, the document tree generator 206, the rendering tree generator 208, the display module 210, the content formatting script 214, the application render restrictor 220, the content element identification module 225, domain based detection module 230, visual based detection module 235, action based detection module 240, and content render restriction module 245 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 600 or system 110 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the content request module 130, the content selection module 135, and the script provider module 140 can be part of the data processing system 110, a single module, a logic device having one or more processing modules, one or more servers, or part of a search engine. In addition, the application 205, the document tree generator 206, the rendering tree generator 208, the display module 210, the application render restrictor 220, the content element identification module 225, domain based detection module 230, visual based detection module 235, action based detection module 240, and content render restriction module 245 can include or can be part of the client device 125, a single module, or a logic device having one or more processing module. The application render restrictor 220, the content element identification module 225, domain based detection module 230, visual based detection module 235, action based detection module 240, and content render restriction module 245 can include or share one or more data processing apparatuses, computing devices, or processors can be part of the client device 125, a single module, or a logic device having one or more processing module.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to attributing a scroll event on an application, the systems and methods described herein can include applied to other environments. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method, comprising:
identifying, by a client device, an information resource for rendering and displaying on a display of the client device, the information resource including a content element defining one or more graphical characteristics;
determining, by the client device, that the content element corresponds to restricted content in accordance with a content detection policy based on the one or more graphical characteristics of the content element, at least in part by determining that a difference between a color value of the content element and a color value of a second content element in the information resource differs by at least a threshold, the threshold defined by the content detection policy as being associated with the restricted content; and
applying, by the client device responsive to determining that the content element corresponds to the restricted content in accordance with the content detection policy, a content restriction policy to the content element to at least partially restrict display of the content element on the information resource.

2. The method of claim 1, further comprising determining, by the client device, that the content element corresponds to restricted content in accordance with an action detection policy based on one or more actions performed on the information resource; and
wherein applying the content restriction policy further comprises applying the content restriction policy responsive to determining that the content element corresponds to the restricted content in accordance with the action detection policy.

3. The method of claim 2, wherein determining that the content element corresponds to the restricted content element in accordance with the action detection policy further comprises detecting a command to reinsert the content element into the information resource in response to deletion of the content element.

4. The method of claim 2, wherein determining that the content element corresponds to the restricted content element in accordance with the action detection policy further comprises detecting a transmission of a pingback associated with the content element.

5. The method of claim 2, wherein determining that the content element corresponds to the restricted content element in accordance with the action detection policy further comprises detecting a change to one or more graphical characteristics of the content element.

6. The method of claim 1, further comprising determining, by the client device, that instructions defining the content element correspond to restricted instructions in accordance with the content detection policy; and
wherein applying the content restriction policy further comprises at least partially removing the instructions defining the content element responsive to determining that the instructions correspond to the restricted instructions.

7. The method of claim 1, wherein determining that the content element corresponds to the restricted content further comprises comparing at least one of a dimension or a position of the content element to at least one of a corresponding dimension or a position defined by the content detection policy as associated with the restricted content.

8. The method of claim 1, wherein determining that the content element corresponds to the restricted content further comprises identifying at least one string in the content element matching one of a plurality of restricted strings defined by the content detection policy as associated with the restricted content.

9. The method of claim 1, wherein applying the content restriction policy further comprises at least one of: (i) altering a content object corresponding to the content element in a document tree generated from the information resource, (ii) altering a style rule defining the content object, (iii) altering a rendering of the content element on the information resource, or (iv) inserting an overlay over the content element to restrict visibility.

10. A client device, comprising:
a display; and
one or more processors coupled with memory, configured to:
identify an information resource for rendering and displaying on the display of the client device, the information resource including a content element defining one or more graphical characteristics;
determine that the content element corresponds to restricted content in accordance with a content detection policy based on the one or more graphical characteristics of the content element, at least in part by determining that a difference between a color value of the content element and a color value of a second content element in the information resource differs by at least a threshold, the threshold defined by the content detection policy as being associated with the restricted content; and
apply, responsive to determining that the content element corresponds to the restricted content in accordance with the content detection policy, a content restriction policy to the content element to at least partially restrict display of the content element on the information resource.

11. The client device of claim 10, wherein the one or more processors are further configured to:
determine that the content element corresponds to restricted content in accordance an action detection policy based on one or more actions performed on the information resource; and
apply the content restriction policy responsive to determining that the content element corresponds to the restricted content in accordance with the action detection policy.

12. The client device of claim 11, wherein the one or more processors are further configured to determine that the content element corresponds to the restricted content element in accordance with the action detection policy by detecting a command to reinsert the content element into the information resource in response to deletion of the content element.

13. The client device of claim 11, wherein the one or more processors are further configured to determine that the content element corresponds to the restricted content element in accordance with the action detection policy by detecting a transmission of a pingback associated with the content element.

14. The client device of claim 11, wherein the one or more processors are further configured to determine that the content element corresponds to the restricted content element in accordance with the action detection policy by detecting a change to one or more graphical characteristics of the content element.

15. The client device of claim 10, wherein the one or more processors are further configured to
determine that instructions defining the content element correspond to restricted instructions in accordance with the content detection policy; and
apply the content restriction policy by at least partially removing the instructions defining the content element responsive to determining that the instructions correspond to the restricted instructions.

16. The client device of claim 10, wherein the one or more processors are further configured to identify at least one string in the content element matching one of a plurality of restricted strings defined by the content detection policy as associated with the restricted content.

17. The client device of claim 10, wherein the one or more processors are further configured to compare at least one of a dimension or a position of the content element to at least one of a corresponding dimension or a position defined by the content detection policy as associated with the restricted content.

18. The client device of claim 10, wherein the one or more processors are further configured to apply the content restriction policy by at least one of: (i) altering a content object corresponding to the content element in a document tree generated from the information resource, (ii) altering a style rule defining the content object, (iii) altering a rendering of the content element on the information resource, or (iv) inserting an overlay over the content element to restrict visibility.

19. A method, comprising:
identifying, by a client device, an information resource for rendering and displaying on a display of the client device, the information resource including a content element defining one or more graphical characteristics;
determining, by the client device, that the content element corresponds to restricted content (i) in accordance with a content detection policy based on the one or more graphical characteristics of the content element and (ii) in accordance with an action detection policy based on one or more actions performed on the information resource; and
applying, by the client device responsive to determining that the content element corresponds to the restricted content in accordance with the content detection policy and in accordance with the action detection policy, a content restriction policy to the content element to at least partially restrict display of the content element on the information resource, wherein determining that the content element corresponds to the restricted content element in accordance with the action detection policy comprises at least one of:
  (i) detecting a command to reinsert the content element into the information resource in response to deletion of the content element; or
  (ii) detecting a change to one or more graphical characteristics of the content element.

20. The method of claim 19, further comprising determining, by the client device, that instructions defining the content element correspond to restricted instructions in accordance with the content detection policy; and
  wherein applying the content restriction policy further comprises at least partially removing the instructions defining the content element responsive to determining that the instructions correspond to the restricted instructions.

21. A client device, comprising:
  a display; and
  one or more processors coupled with memory, configured to:
  identify an information resource for rendering and displaying on the display of the client device, the information resource including a content element defining one or more graphical characteristics;
  determine that the content element corresponds to restricted content (i) in accordance with a content detection policy based on the one or more graphical characteristics of the content element and (ii) in accordance with an action detection policy based on one or more actions performed on the information resource; and
  apply, responsive to determining that the content element corresponds to the restricted content in accordance with the content detection policy and in accordance with the action detection policy, a content restriction policy to the content element to at least partially restrict display of the content element on the information resource,
  wherein determining that the content element corresponds to the restricted content element in accordance with the action detection policy comprises at least one of:
    (i) detecting a command to reinsert the content element into the information resource in response to deletion of the content element; or
    (ii) detecting a change to one or more graphical characteristics of the content element.

22. The client device of claim 21, wherein the one or more processors are further configured to determine that instructions defining the content element correspond to restricted instructions in accordance with the content detection policy; and
  wherein applying the content restriction policy further comprises at least partially removing the instructions defining the content element responsive to determining that the instructions correspond to the restricted instructions.

* * * * *